United States Patent [19]
Ueda

[11] Patent Number: 5,900,860
[45] Date of Patent: May 4, 1999

[54] COLOR CONVERSION DEVICE FOR CONVERTING AN INPUTTED IMAGE WITH A COLOR SIGNAL IN A SPECIFIC COLOR RANGE INTO AN OUTPUT IMAGE WITH A DESIRED SPECIFIC COLOR

[75] Inventor: Masashi Ueda, Nagoya, Japan

[73] Assignee: Brother Kogyo Kabushiki Kaisha, Nagoya, Japan

[21] Appl. No.: 08/734,546

[22] Filed: Oct. 21, 1996

[30] Foreign Application Priority Data

Oct. 20, 1995 [JP] Japan .................................. 7-272816

[51] Int. Cl.$^6$ ...................................................... G09G 5/02
[52] U.S. Cl. .......................... 345/150; 345/153; 345/154; 358/518; 348/630; 348/650
[58] Field of Search ..................... 345/150, 153, 345/154; 358/518; 348/29, 30, 32, 630, 649–651, 661, 675

[56] References Cited

U.S. PATENT DOCUMENTS

| | | | |
|---|---|---|---|
| 5,051,928 | 9/1991 | Gruters | 364/521 |
| 5,241,373 | 8/1993 | Kanamori et al. | 358/27 |
| 5,282,046 | 1/1994 | Yamaguchi | 358/296 |
| 5,398,123 | 3/1995 | Katsuma | 358/518 |
| 5,489,997 | 2/1996 | Usami | 358/522 |
| 5,574,513 | 11/1996 | Topper | 348/652 |
| 5,608,549 | 3/1997 | Usami | 358/530 |
| 5,719,639 | 2/1998 | Imamura | 248/577 |

Primary Examiner—Dennis-Doon Chow
Assistant Examiner—Amr Awad
Attorney, Agent, or Firm—Oliff & Berridge, PLC

[57] ABSTRACT

A color conversion function is corrected in accordance with the input color data (Xin, Yin, Zin) of the original image. The original image is therefore converted into colors which are different from colors of the original image but which are appreciated by the user. One or more specific color is previously determined. The appropriate color value memory 40 stores appropriate output values (Xbesti, Ybesti, Zbesti) for the specific colors. The color value discrimination portion 20 judges whether or not the input color data (Xin, Yin, Zin) is the specific color. When the input color data (Xin, Yin, Zin) is judged as the specific color, the corrected characteristic value calculation portion 24 calculates a correction characteristic value (dXi, dYi, dZi) based on the input color data (Xin, Yin, Zin) and the appropriate calor value. The color-conversion characteristic value correction portion 26 corrects conversion data (A, B, C) stored in the color-conversion characteristic value memory 42 based on the corrected characteristic values (dXi, dYi, dZi). The color conversion portion 28 converts the input color data (Xin, Yin, Zin) based on the corrected conversion data (a, b, c) produced and stored in the corrected color-conversion characteristic value memory 50, thereby outputting desired corrected color data (Xout, Yout, Zout).

10 Claims, 19 Drawing Sheets

| ADDRESS | DISCRIMINATION VALUE (i) |
|---|---|
| A1 | 0 |
| A2 | 0 |
| A3 | 0 |
| A4 | 1 |
| ⋮ | ⋮ |
| A15 | 2 |
| ⋮ | ⋮ |
| An | 3 |

64

| DISCRIMINATION VALUE (i) | MEMORY CONTENT |
|---|---|
| 1 | 0 |
| 2 | 0 |
| 3 | 1 |
| 4 | 0 |
| ⋮ | ⋮ |
| ⋮ | ⋮ |
| i | 0 |

| DISCRIMINATION VALUE (i) | COLOR VALUE ADDING REGION (SUM VALUES) | | | NUMBER MEMORY (ni) |
|---|---|---|---|---|
| | X | Y | Z | |
| 1 | 0 | 0 | 0 | 0 |
| 2 | 20.22 | 24.22 | 23.22 | 2 |
| 3 | . | . | . | . |
| 4 | . | . | . | . |
| . | . | . | . | . |
| . | . | . | . | . |
| i | 88.0 | 98.2 | 103.5 | 1 |

| DISCRIMINATION VALUE (i) | X (Xcolori) | Y (Ycolori) | Z (Zcolori) |
|---|---|---|---|
| 1 | | | |
| 2 | 10.11 | 12.11 | 11.61 |
| 3 | . | . | . |
| 4 | . | . | . |
| . | . | . | . |
| . | . | . | . |
| i | 88.0 | 98.0 | 103.5 |

70

| DISCRIMINATION VALUE (i) | APPROPRIATE COLOR VALUE | | |
|---|---|---|---|
| | X (Xbesti) | Y (Ybesti) | Z (Zbesti) |
| 1 | 5.0 | 5.0 | 5.0 |
| 2 | 14.0 | 10.0 | 10.0 |
| 3 | • | • | • |
| 4 | • | • | • |
| 5 | • | • | • |
| 6 | • | • | • |
| • | • | • | • |
| • | • | • | • |
| n | 95.03 | 100 | 108.9 |

| DISCRIMINATION VALUE (i) | COLOR VALUE | | | CORRECTION VALUE | | | 74 |
|---|---|---|---|---|---|---|---|
| | X (Xcolori) | Y (Ycolori) | Z (Zcolori) | dX (dXi) | dY (dYi) | dZ (dZi) | |
| 1 | | | | | | | |
| 2 | 10.11 | 12.11 | 11.61 | 2.89 | -2.11 | -1.61 | |
| 3 | • | • | • | • | • | • | |
| • | • | • | • | • | • | • | |
| • | • | • | • | • | • | • | |
| i | 88.0 | 98.2 | 103.5 | 7 | 1.8 | 5.5 | |

| ADDRESS | MEMORY CONTENT | | |
|---|---|---|---|
| | A | B | C |
| 1 | 1.2 | 1.3 | 1.1 |
| 2 | 1.2 | 1.2 | 3.5 |
| 3 | 1.1 | 1.1 | 6.5 |
| 4 | 1.2 | 1.3 | 9.5 |
| 5 | · | · | · |
| 6 | · | · | · |
| · | · | · | · |
| · | · | · | · |
| j | 95.029 | 100 | 108.887 |

42

COLOR CONVERSION DEVICE FOR CONVERTING AN INPUTTED IMAGE WITH A COLOR SIGNAL IN A SPECIFIC COLOR RANGE INTO AN OUTPUT IMAGE WITH A DESIRED SPECIFIC COLOR

BACKGROUND OF THE INVENTION

1. Field of the Invention

The present invention relates to a color conversion device for converting a color signal representative of an original image into another color signal.

2. Description of the Related Art

There has been conventionally proposed a color conversion device which converts a color signal representative of an original color into another color signal which is capable of reproducing a color the same as the original color.

SUMMARY OF THE INVENTION

FIG. 1 shows a conceivable color conversion device. In the device, a CPU 102 is connected to a ROM 104. The CPU 102 can retrieve data from the ROM 104. The CPU 102 includes a color conversion portion 108. The ROM 104 is formed with a converted color value memory 110. The color conversion portion 108 is for receiving input color data (PX, PY, PZ), for converting the input color data (PX, PY, PZ) into converted color data (Pc, Pm, Py), and for outputting the converted color data (Pc, Pm, Py).

With this structure, when receiving the input color data (PX, PY, PZ), the color conversion portion 108 performs color conversion operation on the input color data (PX, PY, PZ) while referring to data stored in the converted color value memory 110. The color conversion portion 108 then outputs the converted color data (Pc, Pm, Py).

The input color data (PX, PY, PZ) is defined in an XYZ color space which is determined by Commission Internationale de L'Eelarage (CIE). The converted color data (Pc, Pm, Py) is a set of printer tone signals for printing cyan, magenta, and yellow colors.

Details of the converted color value memory 110 will be described below.

The XYZ color space is defined in a coordinate system made from three axes X, Y, and Z which extend in a color space W. The color space W is divided into a lattice with uniform intervals along the X, Y, and Z axial directions. The lattice therefore forms many cubes J arranged uniformly in the X, Y, and Z axial directions. Each cube J is defined by eight lattice points A, B, C, D, E, F, G, and H. A set of output color data (c, m, y) is previously calculated for a set of color data (X, Y, Z) which represents each of the eight lattice points. The calculation is performed for the eight lattice points of all the cubes J. The obtained sets of output color data (c, m, y) are stored in the memory 110 in correspondence with the color data (X, Y, Z).

The color-conversion operation performed by the color conversion portion 108 will be described below.

It is now assumed that the one set of input color data (PX, PY, PZ) represents a color point P shown in FIG. 2. The color point P resides in a specific cube J. The cube J is defined by eight lattice points A, B, C, D, E, F, G, and H which surround the color point P. The color conversion portion 108 selects, from the converted color value memory 110, eight sets of output values (c, m, y) which are stored in correspondence with the sets of values (X, Y, Z) for the eight lattice points A to H. The eight sets of output values (c, m, y) will be respectively referred to as (Ac, Am, Ay), (Bc, Bm, By), (Cc, Cm, Cy), (Dc, Dm, Dy), (Ec, Em, Ey), (Fc, Fm, Fy), (Gc, Gm, Gy), and (Hc, Hm, Hy). The sets of values (X, Y, Z) for the lattice points A and H will be referred to as (AX, AY, AZ) through (HX, HY, HZ), respectively.

The color conversion portion 108 calculates output data (Pc, Pm, Py) for the input color data (PX, PY, PZ) through an interpolation calculation as defined in the following formulas (1):

$$Pc=KA*AC+KB*BC+KC*Cc+KD*Dc+KE*Ec+KF*Fc+KG*Gc+KH*Hc$$

$$Pm=KA*Am+KB*Bm+KC*Cm+KD*Dm+KE*Em+KF*Fm+KG*Gm+KH*Hm$$

$$Py=KA*AY+KB*By+KC*Cy+KD*Dy+KE*EY+KF*Fy+KG*Gy+KH*Hy \quad (1)$$

where * indicates a multiplication, and the weight coefficients KA, KB, KC, KD, KE, KF, KG, and KH are defined in the following formulas (2):

$$KA=(TX-SX)*(TY-SY)*(TZ-SZ)/(TX*TY*TZ)$$

$$KB=(TX-SX)*(TY-SY)*SZ/(TX*TY*TZ)$$

$$KC=(TX-SX)*SY*(TZ-SZ)/(TX*TY*TZ)$$

$$KD=(TX-SX)*SY*SZ/(TX*TY*TZ)$$

$$KE=SX*(TY-SY)*(TZ-SZ)/(TX*TY*TZ)$$

$$KF=SX*(TY-SY)*SZ/(TX*TY*TZ)$$

$$KG=SX*SY*(TZ-SZ)/(TX*TY*TZ)$$

$$KH=SX*SY*SZ/(TX*TY*TZ) \quad (2)$$

where TX, TY, TZ, SX, SY, and SZ represent distances defined below as shown in FIG. 3.

$$TX=HX-AX,$$

$$TY=HY-AY,$$

$$TZ=HZ-AZ,$$

$$SX=PX-AX,$$

$$SY=PY-AY,$$

and $$SZ=PZ-AZ.$$

The thus obtained output (Pc, Pm, Py) will accurately reproduce a color represented by the input data (PX, PY, PZ).

It is noted that there is a possibility that the original image has low quality. For example, when the original image is comprised of a photograph taken by an ordinary user, the original image will possibly fail to have a good quality. The color of the photograph will possibly be too dense when the photograph is taken against the light. The color of the photograph will also be too dense when the photograph is taken for a portion located in the shade of a certain object. The color will also become dense due to an insufficient exposure. When the original image is a computer-generated image produced on an ordinary user's controlled CRT, the original image will possibly have a low quality when printed by the printer. This is because the ordinary user generally does not know well the color reproducibility of the printer. In those cases, even when the output data, produced by the color conversion device, accurately reproduces the input color data, the output data will fail to provide a good quality image.

In order to obtain a good quality image, the user has to manipulate the computer to perform various image editing operations and to adjust the color balances and the tone reproducibility. It is, however, very difficult for the ordinary user to handle the computer image editing function.

It is therefore, an object of the present invention to overcome the above-described drawbacks, and to provide an improved color conversion device which can automatically correct its color conversion function in accordance with an inputted original image and in accordance with the human visual sense and which can convert the original image color into a color which is different from the original color but which can provide a human desired output color.

In order to attain the above and other objects, the present invention provides a color conversion device capable of converting a color signal of an inputted image into a corrected color signal indicative of a corrected image, the device comprising: color conversion means for converting a color signal of an inputted image into another color signal; conversion characteristic memory means for storing a conversion characteristic value indicative of a color conversion characteristic of the color conversion means; specific color information memory means for storing information on each of one or more specific color; judging means for judging whether or not the color signal of the inputted image corresponds to the specific color; correction value calculation means for calculating a characteristic correction value based on the judged color signal and the information stored in the specific color information memory means; and conversion characteristic correction means for correcting the conversion characteristic value, stored in the conversion characteristic memory means, based on the characteristic correction value.

BRIEF DESCRIPTION OF THE DRAWINGS

The above and other objects, features and advantages of the invention will become more apparent from reading the following description of the preferred embodiment taken in connection with the accompanying drawings in which:

FIG. 5 (b) illustrates another method how to convert colors distributed on an original image into other colors;

FIG. 5 (c) illustrates how a color reproducible range of the CRT is different from a color reproducible range of a printer;

FIG. 11 shows an input color value memory;

FIG. 12 shows a color value memory;

DETAILED DESCRIPTION OF THE PRESENT INVENTION

First, a color conversion mechanism employed in a color conversion device of the present invention will be described below.

Figure 2:
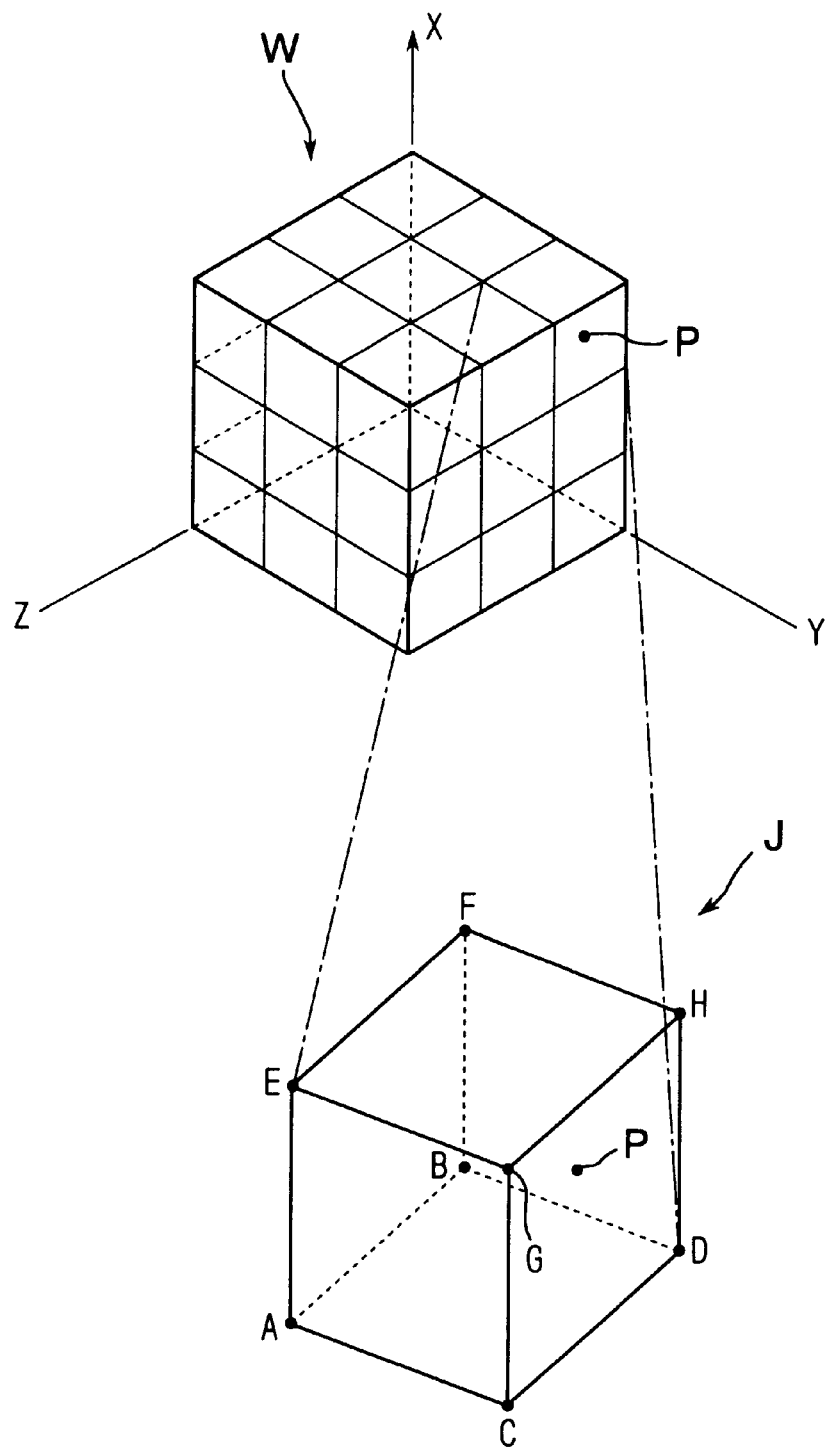
FIG. 2 illustrates a color space defined in a color-converted value memory in the device of FIG. 1.
Figure 3:
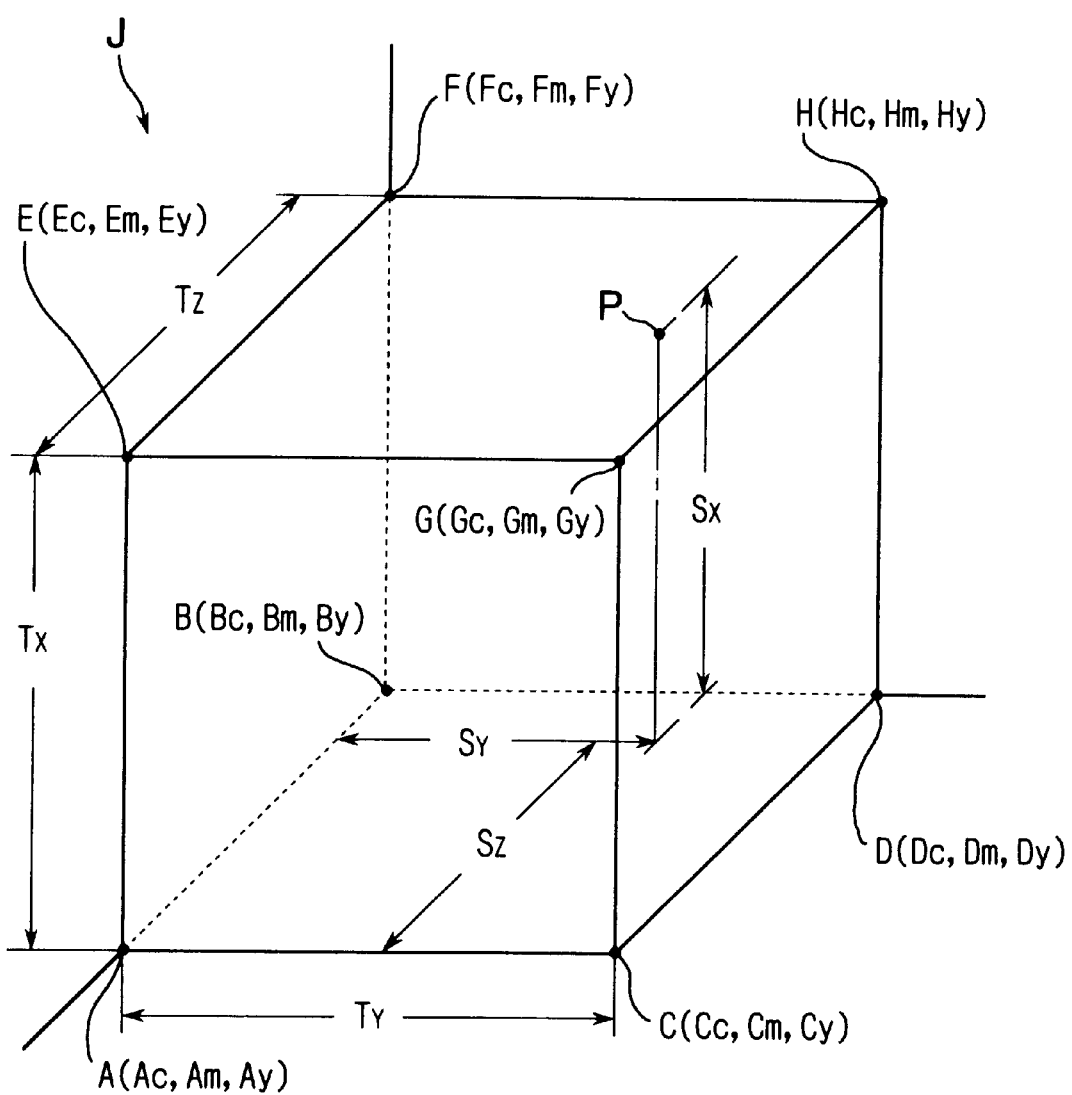
FIG. 3 illustrates how to calculate interpolation in a color conversion portion in the device of FIG. 1.
Figure 4:
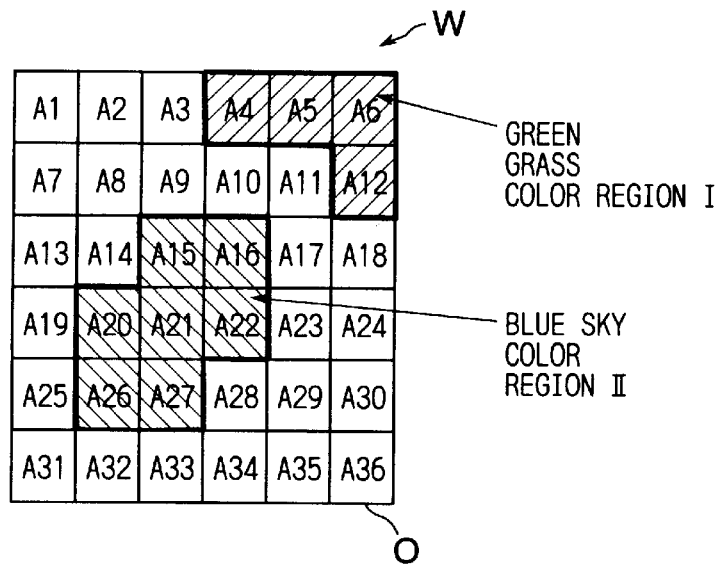
FIG. 4 illustrates how several color regions are distributed in the color space.

FIG. 4 two-dimensionally shows the XYZ lattice color space of FIG. 2. As apparent from the figure, a plurality of cubes J (A1 through A36) are arranged in this XYZ color lattice space.

The present inventor has discovered that there are the cases where colors in certain color regions should preferably be converted into different colors rather than converted into the same colors. For example, colors of green grass are distributed in the cubes A4 through A6 and A12 (which will be referred to collectively as region I). Colors of blue sky are distributed in the cubes A15–A16, A20–A22, and A26–A27 (which will be referred to collectively as region II).

There are the cases where those green grass colors should not be converted into exactly the same colors but should be converted into a green color thought of as typical for green grass. Similarly, there are the cases where those blue sky colors should not be converted into exactly the same colors but should be converted into a blue color thought of as typical for blue sky. A Region "0" other than those regions I and II will be referred to as a remaining region "0" hereinafter.

Figure 1:
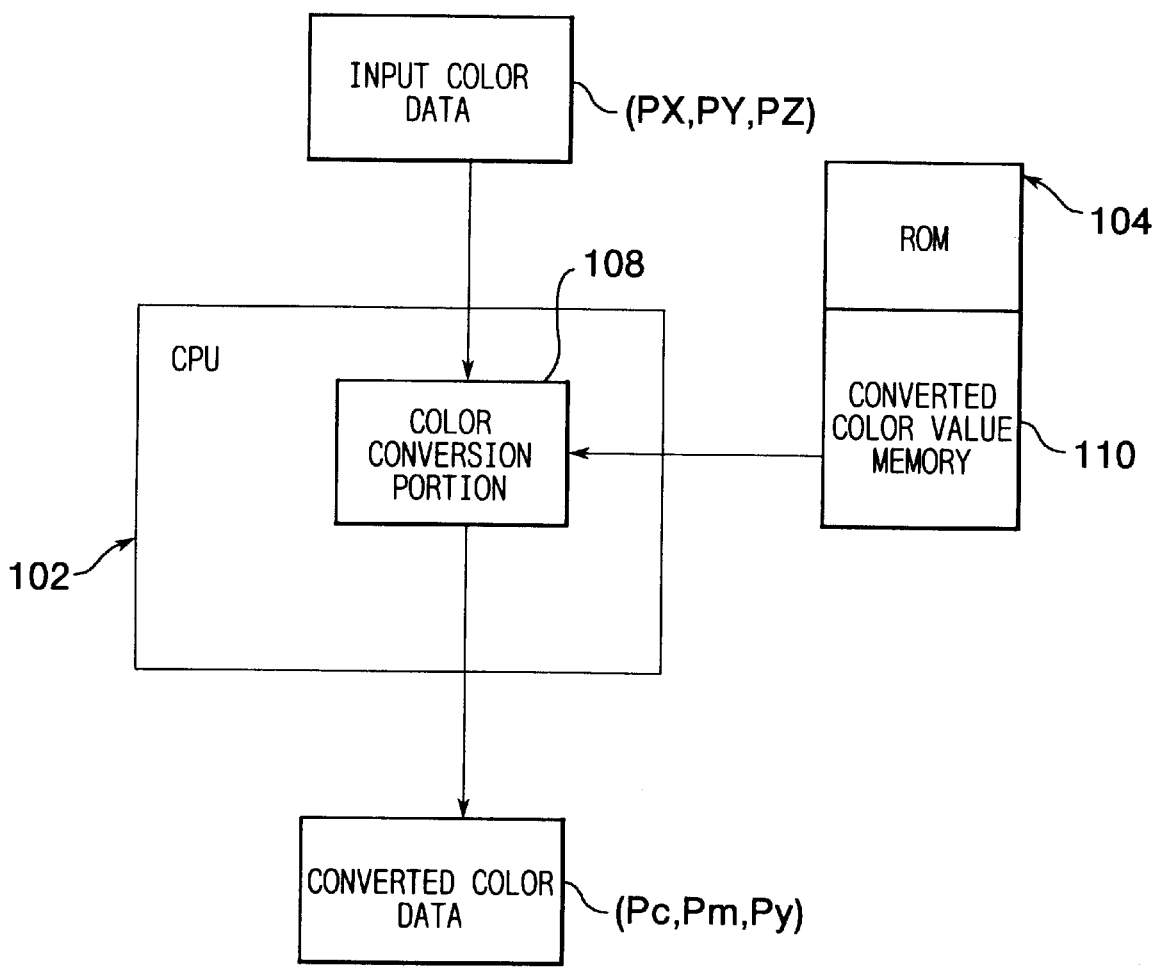
FIG. 1 is a block diagram of a conceivable color conversion device.

In view of this, according to the present invention, those regions I and II are previously determined as discriminated from the remaining region 0. When desired, color value sets (X, Y, Z), falling within the region I, are changed into another set of color value (X1, Y1, Z1) which represents the typical green grass color. Color value sets (X, Y, Z), falling within the region II, are changed into another set of color value (X2, Y2, Z2) which represents the typical blue sky color. Afterwardly, the thus obtained typical or ideal color value sets (X1, Y1, Z1) and (X2, Y2, Z2) will be converted by the color conversion device of FIG. 1 into color value sets (C1, M1, Y1) and (C2, M2, Y2), respectively.

A standard color conversion characteristic, for converting colors in each color region into its corresponding typical color, can be determined in a manner described below.

This description is given for an example where a standard color conversion characteristic is determined for converting colors in the color region I into the typical green grass color.

A color reproduction device, such as a CRT, is first controlled to display several colors including green colors. Then, a color thought of as typical for green grass is selected out of the displayed several colors. The typical green grass color is detected by a calorimeter as a standard set of appropriate color values (Xbest, Ybest, Zbest). Then, a color region, which can be perceived approximately as green grass color, is selected out of the displayed several colors. This color region is detected by the calorimeter, and an average value of the detected results is used as a standard set of color average values (Xcolor', Ycolor', Zcolor'). Based on the standard set of appropriate color values (Xbest, Ybest, Zbest) and the standard set of color average values (Xcolor', Ycolor', Zcolor'), the standard color conversion characteristic is determined.

Figure 5:
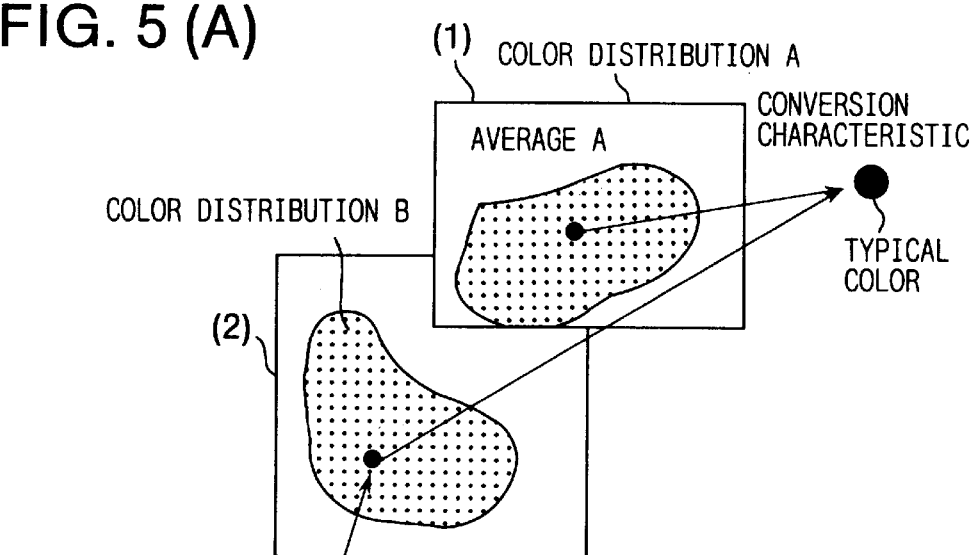
FIG. 5 (a) illustrates one method how to convert colors distributed on an original image into an appreciated color.
Figure 5:
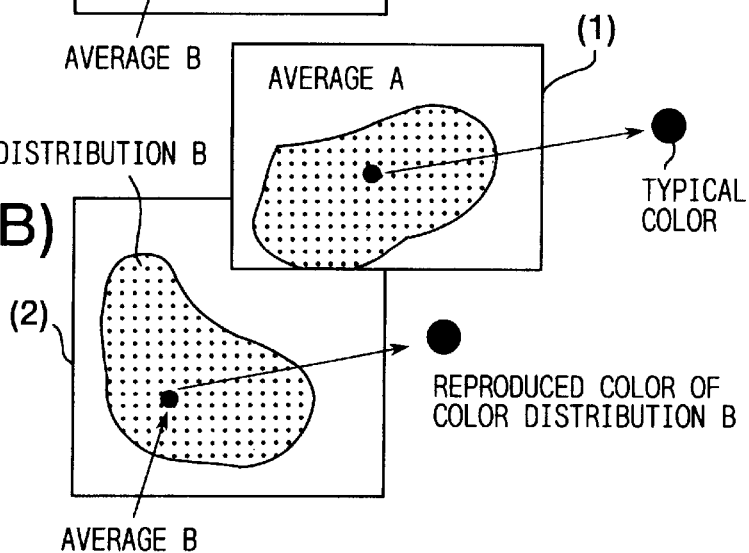
Figure 5:
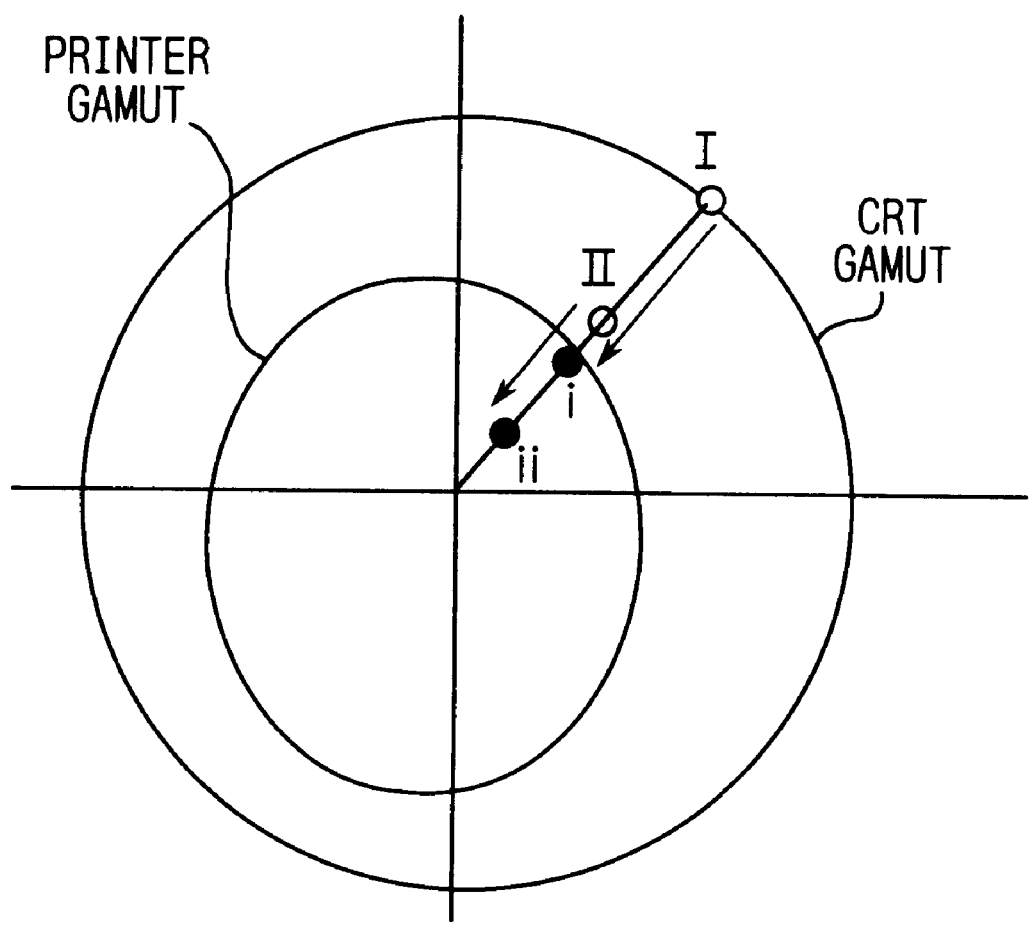

As shown in FIG. 5(b), it is now assumed that two originals (1) and (2) have two color areas A and B both of which belong to the same green color region I. It is noted, however, that how colors are distributed in the area A is different from how colors are distributed in the area B.

Accordingly, as shown in FIG. 5(B), when the colors in the areas A and B are both converted with the above-described standard conversion characteristic, there is a possibility that the colors in the area A will be properly converted into the typical green grass color, but the colors in the area B will fail to be converted into the typical green grass color.

In view of this, according to the present invention, as shown in FIG. 5(a), an average color value set (Xcolor, Ycolor, Zcolor) is calculated for the colors distributed in the area A of the original (1). Then, a conversion characteristic is determined for that original (1) based on the calculated color average value set (Xcolor, Ycolor, Zcolor) and the appropriate color value set (Xbest, Ybest, Zbest). With the thus produced conversion characteristic, any colors in the area A can be properly changed into the typical green grass color.

Similarly, an average color value set (Xcolor, Ycolor, Zcolor) is also calculated for the colors distributed in the area B of the other original (2). Then, a conversion characteristic is determined for that original (2) based on the calculated color average value set (Xcolor, Ycolor, Zcolor) and the appropriate color value set (Xbest, Ybest, Zbest). With the thus produced conversion characteristic, any colors in the area B can also be properly changed into the typical green grass color.

A color conversion device according to preferred embodiments of the present invention will be described below while referring to the accompanying drawings wherein like parts and components are designated by the same reference numerals to avoid duplicating description.

First, a first embodiment of the color conversion device of the present invention will be described below with referring to FIGS. 5(C) through 23.

The first embodiment provides a color conversion device of a type for converting or compressing a color reproducible range (first gamut) into another color reproducible range (second gamut). The color conversion operation is attained in the XYZ color space.

This color conversion device is used for transferring input color data (Xin, Yin, Zin), produced at one type of color reproduction device (a CRT, for example), to another type of color reproduction device (a printer, for example) so that the other type of color reproduction device will reproduce the input color data.

It is noted that different types of reproduction devices are designed to reproduce colors with using different color components and different color mixing mechanisms. For example, the CRT reproduces colors with red, green, and blue color components through an additive mixing method. Contrarily, the printer reproduces colors with cyan, magenta, and yellow color components through a subtractive mixing method. Accordingly, different types of color reproduction devices can reproduce colors in different color ranges. FIG. 5(C) shows how the color reproducible range (gamut) of the CRT is different from and broader than the color reproducible range (gamut) of the printer.

The color conversion device of the present embodiment is for converting an input color data set (Xin, Yin, Zin) into an output color data set (Xout, Yout, Zout) so that the color reproducible range of the CRT will be compressed into within the color reproducible range of the printer. The output color data set (Xout, Yout, Zout) will allow the printer to reproduce the color approximately the same as that reproduced on the CRT by the input data set (Xin, Yin, Zin).

According to this color conversion operation, as shown in FIG. 5(c), color data sets "I" and "II", which are within the CRT reproducible range but which are out of the printer reproducible range, are converted or compressed into color data sets "i" and "ii" which are within the printer reproducible range. The color data sets "i" and "ii" can control the printer to reproduce the colors the same as those of colors "I" and "II".

In order to perform this color conversion operation, the color conversion device of the present embodiment is provided with a color-conversion characteristic value memory 42. The memory 42 stores therein conversion characteristic data for converting input data (Xin, Yin, Zin), located within the CRT color reproducible range, into output data (Xout, Yout, Zout) located within the printer color reproducible range.

Figures 21, 22:
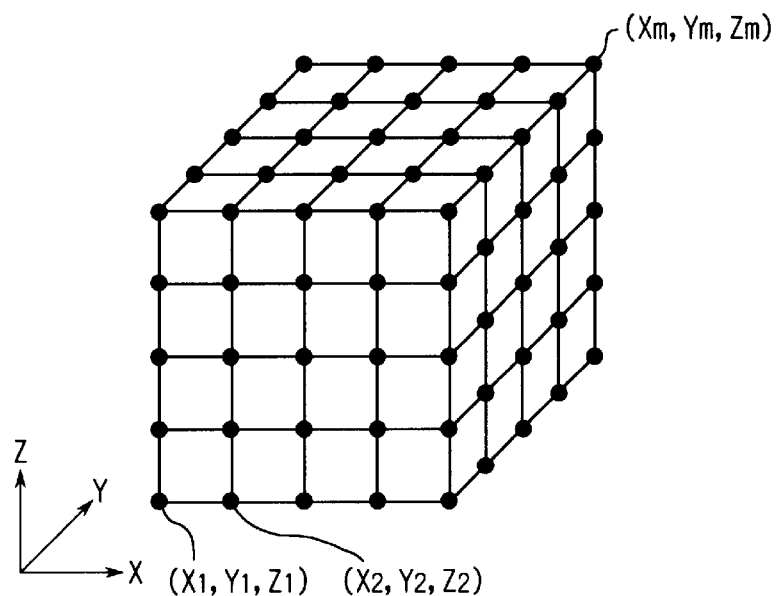
FIG. 21 illustrates a color space defined in a color conversion characteristic value memory.
FIG. 22 shows a construction of a color conversion characteristic value memory.

In more concrete terms, the XYZ color space is defined only in the CRT color reproducible range, and is then divided into a lattice space in the similar manner as shown in FIG. 2. All the lattice points (Xno, Yno, Zno) ($1 \leq no \leq m$) are defined as shown in FIG. 21. A set of output data (A, B, C) is previously calculated for each lattice point (Xno, Yno, Zno). The set of output data (A, B, C) is for reproducing substantially the same color as that of the corresponding color data (Xno, Yno, Zno) and is located within the printer color reproducible range. The memory 42 stores the output data set (A, B, C) at an address indicative of a corresponding lattice point (Xno, Yno, Zno) as shown in FIG. 22. Thus, the memory 42 stores all the sets of output data set (A, B, C) as conversion characteristic value sets in correspondence with all the lattice points (Xno, Yno, Zno).

A color conversion portion 28 in the color conversion device can convert the input data (Xin, Yin, Zin) into the output data (Xout, Yout, Zout) with using the conversion characteristic values sets (A, B, C) through an interpolation method as described below.

The portion 28 first searches eight lattice points (Xno, Yno, Zno) that surround the input color data (Xin, Yin, Zin), in the same manner as shown in FIG. 2. Then, the output data (Xout, Yout, Zout) is calculated through interpolating the color conversion characteristic value sets (A, B, C) which are stored in the memory 42 for the eight lattice points. The interpolation calculation is attained in the same manner as described above with the formulas (1) and (2).

According to the present invention, in order to convert the certain colors, which should not be converted into the same colors but which should be converted into their typical colors, the conversion characteristic data (A, B, C) stored in the memory 42 is corrected and then used to convert those certain colors.

The first embodiment will be described below in greater detail.

Figure 6:
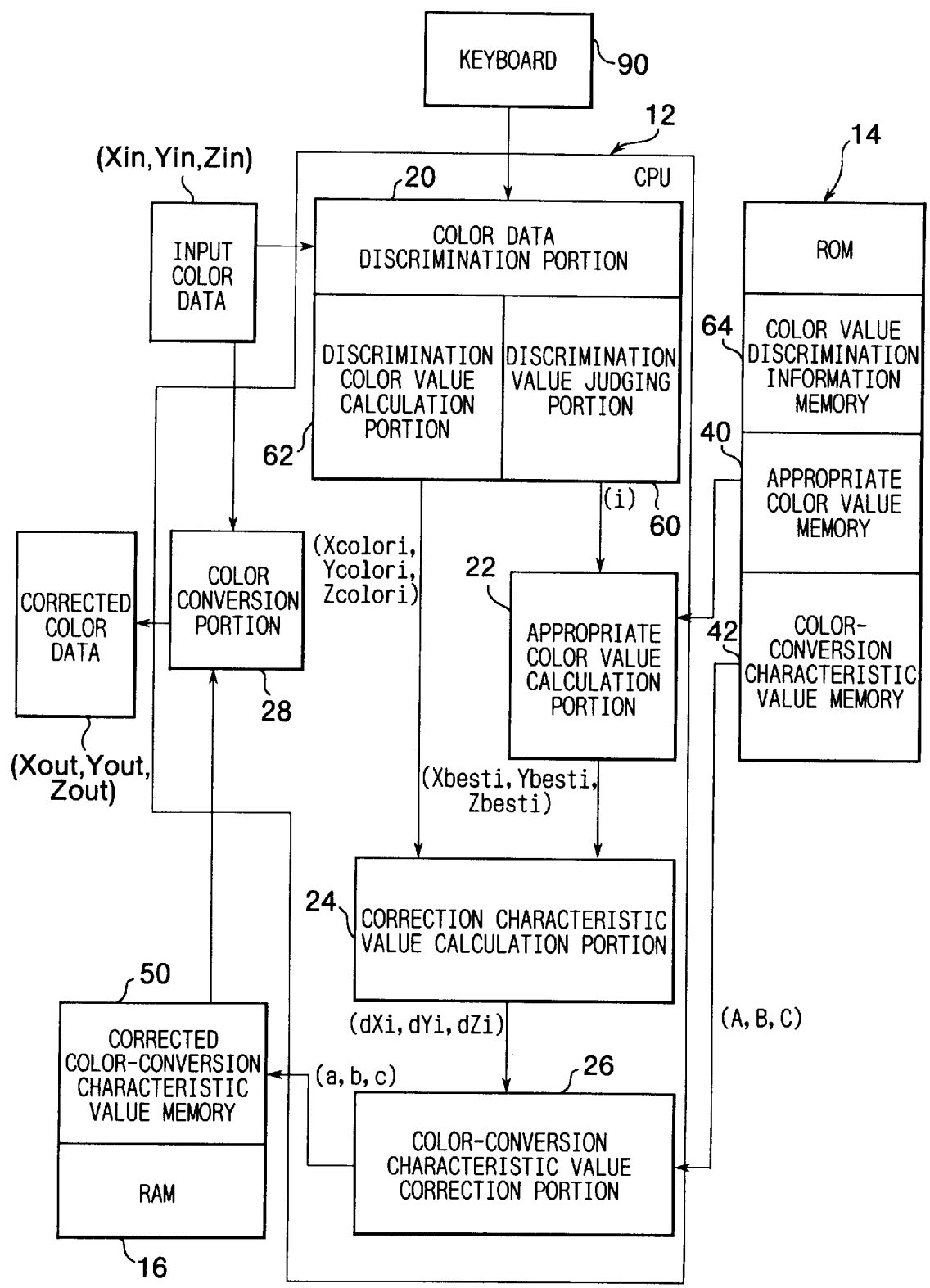
FIG. 6 is a block diagram of a color conversion device of a first embodiment of the present invention.

As shown in FIG. 6, in the color conversion device of the present embodiment, a CPU 12 is connected to: a ROM 14, a RAM 16, and a key board 90. Data can be transmitted between the CPU 12 and the ROM 14, the RAM 16, and the key board 90. A user can manipulate the key board 90 to select a certain color, such as a green grass color and a blue sky color desired to be converted into their typical colors. The CPU 12 includes: a color value discrimination portion 20; an appropriate color value calculation portion 22; a correction characteristic value calculation portion 24; a color-conversion characteristic value correction portion 26; and a color conversion portion 28.

The ROM 14 is formed with: an appropriate color value memory 40; the color-conversion characteristic value memory 42; and a color value discrimination information memory 64. The RAM 16 is formed with a corrected color-conversion characteristic value memory 50.

The color value discrimination portion 20 is for receiving input color data (Xin, Yin, Zin) which is defined in the XYZ color space. The color value discrimination portion 20 is also for receiving data on the user's selected colors from the key board 90. Based on the inputted data, the color value discrimination portion 20 produces an average color value set (Xcolori, Ycolori, Zcolori) for a discrimination value (i) indicative of the user's selected color.

The appropriate color value calculation portion 22 is for receiving the discrimination value (i) from the color value discrimination portion 20. Based on the inputted data, the appropriate color value calculation portion 22 retrieves an appropriate color value set (Xbesti, Ybesti, Zbesti) for the discrimination value (i) from the appropriate color value memory 40. The appropriate color value calculation portion 22 outputs the appropriate color value set (Xbesti, Ybesti, Zbesti) to the correction characteristic value calculation portion 24.

The correction characteristic value calculation portion 24 is for receiving the appropriate color value set (Xbesti, Ybesti, Zbesti) from the appropriate color value calculation portion 22. The portion 24 is also for receiving the average color value set (Xcolori, Ycolori, Zcolori) from the color value discrimination portion 20. Based on the thus inputted color values, the portion 24 outputs a correction characteristic value (dXi, dYi, dZi).

The color-conversion characteristic value correction portion 26 is for receiving the correction characteristic value set (dXi, dYi, dZi) from the portion 24. The portion 26 is for retrieving color conversion characteristic value sets (A, B, C) from the color-conversion characteristic value memory 42. Based on the inputted data, the portion 26 produces a corrected color-conversion characteristic value sets (a, b, c).

The corrected color-conversion characteristic value memory 50 is for storing the corrected color-conversion characteristic value sets (a, b, c) outputted from the portion 26. The color conversion portion 28 is for retrieving the corrected color-conversion characteristic value sets (a, b, c) from the memory 50. When inputted with the input color data (Xin, Yin, Zin). the color conversion portion 28 converts the input color data (Xin, Yin, Zin) with the corrected characteristic value set (a, b, c) into a corrected color data set (Xout, Yout, Zout). The color data set (Xout, Yout, Zout) may be converted by the other color conversion device shown in FIG. 1 into a control signal set (c, m, y), for example.

Figure 7:
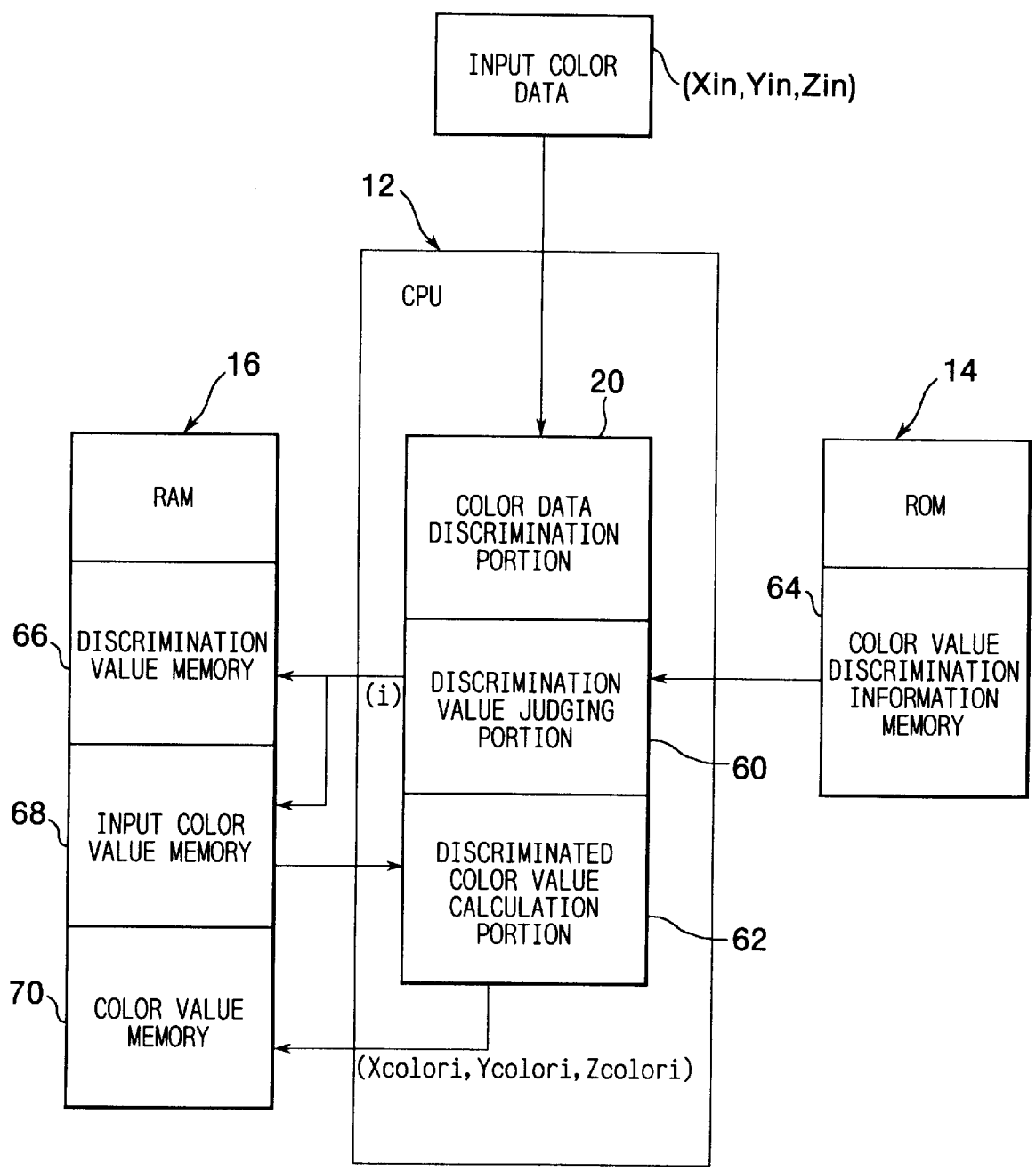
FIG. 7 is a block diagram of a color value discrimination portion.

Next, details of the color value discrimination portion 20 will be described below with referring to FIG. 7.

The color value discrimination portion 20 is constructed from: a discrimination value judging portion 60 and a discriminated color value calculation portion 62. The RAM 16 is further formed with: a discrimination value memory 66; an input color value memory 68; and a color value memory 70.

The discrimination value judging portion 60 is for receiving the input color data (Xin, Yin, Zin) and for retrieving a discrimination value (i), indicative of a color region where the input color data (Xin, Yin, Zin) resides, from the color value discrimination information memory 64. Based on the inputted data, the discrimination value judging portion 60 rewrites data in the discrimination value memory 66 and the input color value memory 68.

The discriminated color value calculation portion 62 is for retrieving data from the input color value memory 68. Based on the retrieved data, the discriminated color value calculation portion 62 produces an average color value set (Xcolori, Ycolori, Zcolori) and rewrites the color value set (Xcolori, Ycolori, Zcolori) in the color value memory 70.

Figures 8, 9, 10:
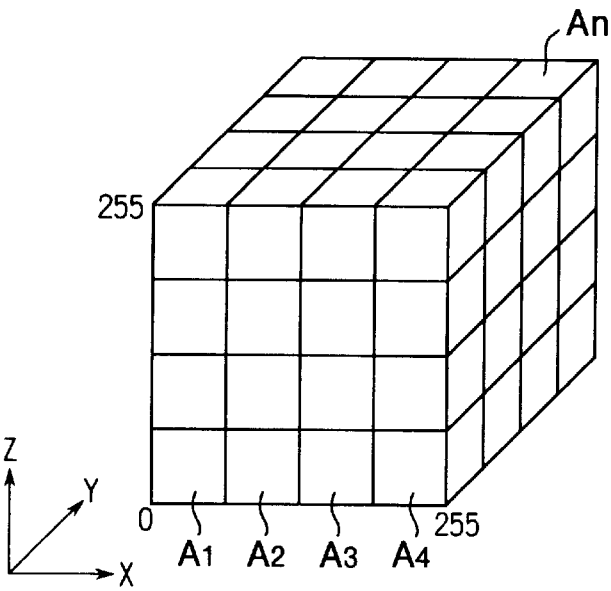
FIG. 8 illustrates how a color space is defined in a color value discrimination information memory.
FIG. 9 shows a color value discrimination information memory.
FIG. 10 shows a discrimination value memory.

As shown in FIG. 8, the input color data (Xin, Yin, Zin) is defined in the coordinate system made from three axes X, Y, and Z which extend in the XYZ color space W. The color space W is divided into a lattice with uniform intervals of optional extends along the X, Y, and Z axial directions. The lattice therefore forms many cubes arranged uniformly in the X, Y, and Z axial directions. Address numbers A1 through An are allocated to all the cubes as shown in the figure. The color value discrimination information memory 64 stores a discrimination value (i) at each of the addresses A1 through An as shown in FIG. 9.

The discrimination values (i) stored in the memory 64 are for discriminating the regions I, II, and 0 defined as shown in FIG. 4. That is, "1" is stored as the discrimination value (i) for the color region I. Accordingly, "1" is stored in the memory 64 at addresses of the cubes A4–A6 and A12 that constitute the color region I. "2" is stored as the discrimination value (i) for the region II. Accordingly, "2" is stored in the memory at addresses of the cubes A15, A16, A20–A22, A26, and A27 that constitute the color region II. "0" is stored as the discrimination value for the region 0. According to the present embodiment, other several color regions III, IV, . . . are also determined as color regions that should preferably be converted into their typical colors. Discrimination values 3, 4, . . . are respectively determined for indicating those regions. For example, Japanese people's skin colors, distributing in the color region III, are preferably converted into their typical colors. "3" is stored as the discrimination value (i) for the cubes that constitute the region III.

As shown in FIG. 10, the discrimination value memory 66 stores the discrimination values (i) as its addresses. The discrimination value memory 66 can store either zero (0) or one (1) in correspondence with each address.

As shown in FIG. 11, the input color value memory 68 also stores the discrimination values (i) as its addresses. At each address, the memory 68 has a sum value area and a number counting area. The sum value area, at each address, is for adding, into sum values Xsumi, Ysumi, and Zsumi, the values Xin, Yin, and Zin of several sets of input color data (Xin, Yin, Zin) that reside in a color region indicated by the corresponding discrimination value (i). The number counting area, at each address, is for storing the total number "ni" of the input color data sets (Xin, Yin, Zin) that reside in the color region indicated by the corresponding discrimination value (i).

As shown in FIG. 12, the color value memory 70 also stores the discrimination values (i) as its addresses. The color value memory 70 has a memory area for storing the average values Xcolori, Ycolori, and Zcolori for each color region I, II, . . . indicated by a corresponding discrimination value (i).

With the above-described structure, the color conversion device performs a color conversion operation as described below.

First, the color value discrimination portion 20 requests a user to select a specific color region desired to be discriminated from other color regions and desired to be converted into their typical colors. The user will therefore manipulate the key board 90 to set one or more specific color regions desired to be converted into their typical color. For example, the user can input a discrimination value (i) indicative of the color. The user can also input a name of color, such as green grass color, blue sky color, and Japanese skin color. Or, the user can set a kind of the original, such as a landscape, a portrait, a graph, and a letter.

Based on the information thus inputted from the key board 90, the color value discrimination portion 20 selects one or more specific color regions desired to be discriminated from other colors. For example, when the user selects a landscape as the original kind, the color value discrimination portion 20 selects the green grass color and the blur sky color as the user's selected specific color regions. Accordingly, the portion 20 sets the discrimination values "1" and "2" as indicative of the user's selected specific colors. On the other hand, when the user selects a Japanese person's portrait as the original kind, the color value discrimination portion 20 selects a Japanese people's skin color as the specific color region. Accordingly, the portion 20 sets the discrimination value "3" as the user's selected specific color region. Similarly, when the user selects a graph as the original kind, the portion 20 selects four color regions: red, blue, green, and yellow as the specific color regions. Thus selected color regions will be referred to as "specific color regions" hereinafter. The discrimination values thus set by the portion 20 as indicative of the specific color regions will be referred to as "specific discrimination values" hereinafter.

Figure 13:
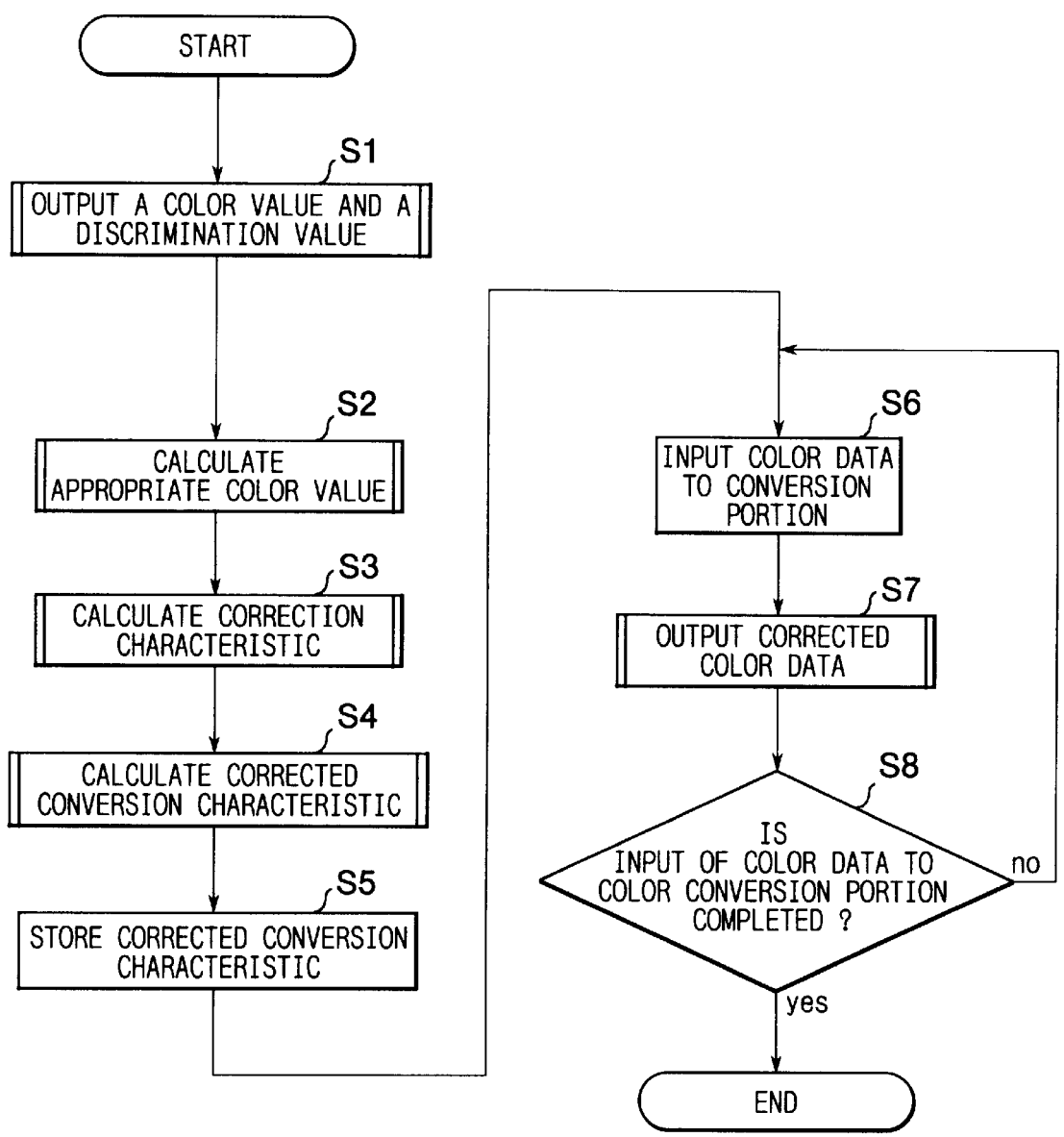
FIG. 13 is a flow chart of an operation performed in the first embodiment.

Afterward, the CPU 12 performs color conversion procedures as shown in FIG. 13.

First, in S1, the color value discrimination portion 20 determines discrimination values (i) indicative of the color regions where color points, represented by a plurality of input color data sets (Xin, Yin, Zin) of one original image, reside. The portion 20 produces average color value sets (Xcolori, Ycolori, Zcolori) for the specific color regions (i) based on the inputted color data sets (Xin, Yin. Zin) that reside in those color regions (i). The portion 20 outputs the produced average color value sets (Xcolori, Ycolori, Ycolori) and the discrimination values (i) indicative of the input data-residing specific color regions. The average color value sets (Xcolori, Ycolori, Zcolori) are recorded in the memory 70 at the addresses of the corresponding discrimination values (i). The memory content in the discrimination value memory 66 is rewritten from zero (0) to one (1) at the addresses of the discrimination values (i) indicative of the input data-residing specific color regions.

Then, in S2, the appropriate color value calculation portion 22 outputs appropriate color value sets (Xbesti, Ybesti, Zbesti), which are stored in the appropriate color value memory 40 at addresses indicated by the discrimination values (i) outputted from the portion 20. The appropriate color value sets (Xbesti, Ybesti, Zbesti) are then stored in a memory area (not shown in the drawing).

Then, in S3, the correction characteristic value calculation portion 24 calculates correction characteristic value sets (dXi, dYi, dZi) based on the appropriate color value sets (Xbesti, Ybesti. Zbesti) and the average color value sets (Xcolori, Ycolori, Zcolori).

Next, in S4, the color-conversion characteristic value correction portion 26 calculates corrected color-conversion characteristic value sets (a, b, c) based on the correction characteristic values (dXi, dYi, dZi) outputted from the portion 24 and the conversion characteristic value sets (A, B, C) retrieved from the color-conversion characteristic value memory 42.

In S5, the thus produced corrected color-conversion characteristic value sets (a, b, c) are stored in the corrected color-conversion characteristic value memory 50.

Then, in S6, the input color data (Xin, Yin, Zin) is inputted to the color conversion portion 28. Based on the corrected color-conversion characteristic value sets (a, b, c) stored in the memory 50, the color conversion portion 28 converts the input color data (Xin, Yin, Zin) into corrected color data (Xout, Yout, Zout) in S7. Then, it is judged in S8 whether or not input of the input color data (Xin. Yin, Zin) to the color conversion portion 28 is completed. When the input is completed (yes in S8), the process ends.

While the input of the input color data (Xin, Yin, Zin) to the color conversion portion 28 is not yet completed (No in S8), the process returns to S6, and the procedures of S7 and S8 are repeated. Thus, all the sets of color data (Xin, Yin, Zin), representative of all the picture elements of the original image, are converted into output data (Xout, Yout, Zout).

Figure 14:
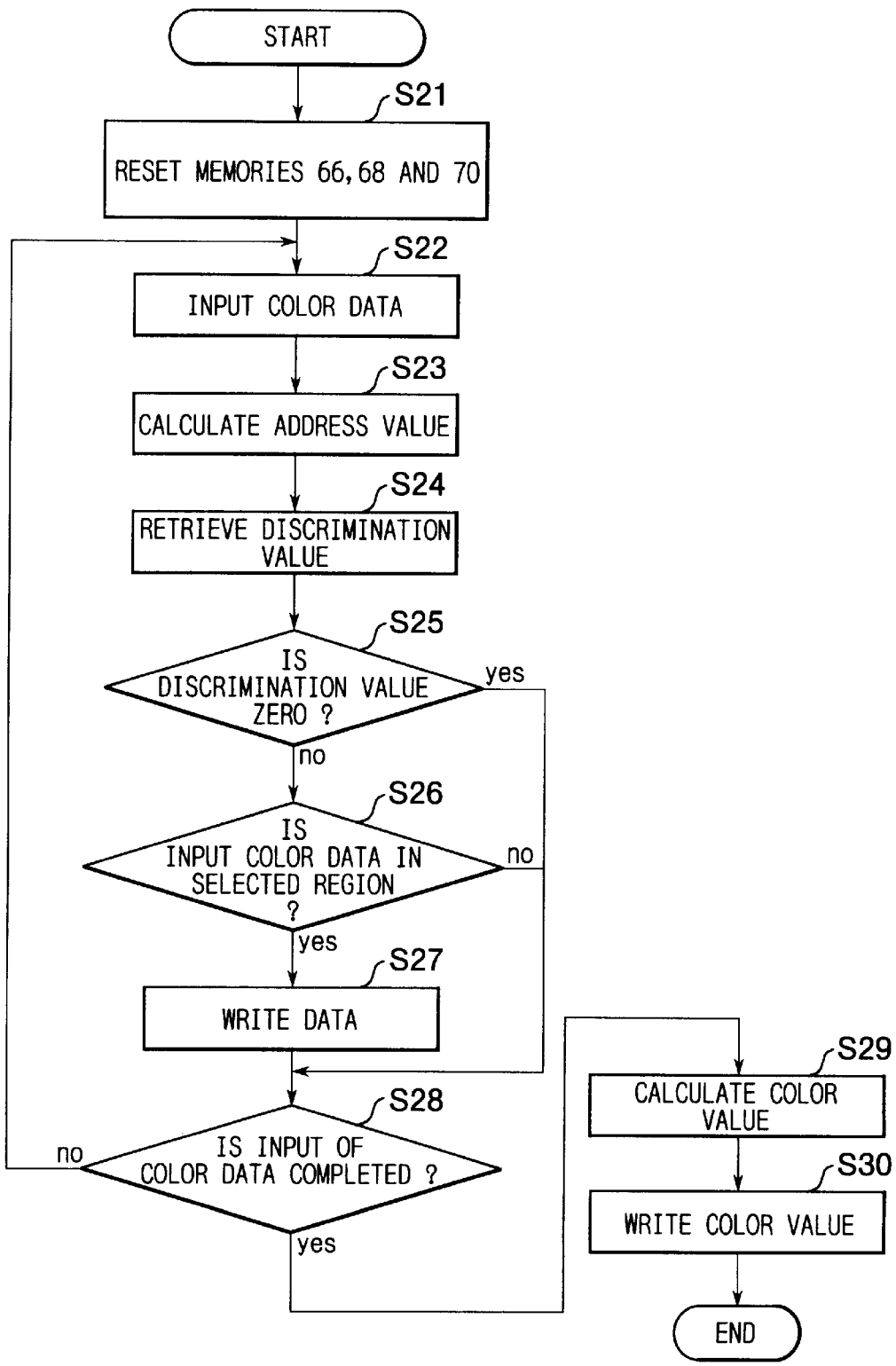
FIG. 14 is a flow chart of an operation of the color discrimination portion.

Next, details of the operation performed by the color value discrimination portion 20 at S1 will be described below with reference to FIG. 14.

When the process starts, a value of zero (0) is written in S21 in the storage areas at all the addresses of the discrimination value memory 66, the input color value memory 68, and the color value memory 70. Then, in S22, the discrimination value judging portion 60 starts receiving, set one by one, a plurality of sets of input color data (Xin, Yin, Zin) which construct one original image. When the first set of input color data (Xin, Yin, Zin) is inputted to the portion 60, the portion 60 calculates, in S23, an address number Aadress of a cube J where the input color data set (Xin, Yin, Zin) resides. The address number Aadress will therefore be used for referring to data in the color value discrimination information memory 64.

The calculation operation performed in S23 will be described below. It is now assumed that X-, Y-, and Z-components of input color data (Xin, Yin, Zin) inputtable to the color value discrimination portion 20 have maximum values Xmax, Ymax, and Zmax, and minimum values Xmin, Ymin, and Zmin. As shown in FIG. 8, the XYZ color space is uniformly divided into the plurality of cubes A1 through An. In more concrete terms, the color space is divided along the X-axial direction by the number of Xstep. The color space is divided along the Y-axial direction by the number of Ystep. The color space is divided along the Z-axial direction by the number of Zstep. The address number Aadress of the cube, where a color point indicated by the inputted color data set (Xin, Yin, Zin) resides, is therefore calculated through the following formulas (3):

$$Xadress = Xin/Xspace$$
$$Yadress = Yin/Yspace$$
$$Zadress = Zin/Zspace$$
$$Aadress = Zadress + Zstep*(Yadress + Ystep*Xadress) \quad (3)$$

where Xspace, Yspace, and Zspace are calculated in the following formulas (4):

$$Xspace = (Xmax - Xmin)/Xstep$$
$$Yspace = (Ymax - Ymin)/Ystep$$
$$Zspace = (Zmax - Zmin)/Zstep \quad (4)$$

Thus, in S23, the portion 20 calculates the address number Aadress of the cube where the input data set (Xin, Yin, Zin) resides.

Then, in S24, the portion 20 retrieves a discrimination value (i), which is stored in the color value discrimination information memory 64 at an address indicated by the calculated address number Aadress. For example, when the calculated address number Aadress indicates the address A4, the discrimination value "1" is retrieved from the memory 64.

Then, in S25, it is judged whether or not the retrieved discrimination value (i) is zero (0). If the discrimination value (i) is other than zero (no in S25), the program proceeds to S26. In S26, it is further judged whether or not the retrieved discrimination value (i) indicates one of the specific color regions which have been set by the portion 20 based on the user's selection. When the retrieved discrimination value (i) is one of the specific discrimination values indicative of the specific color regions (yes in S26), the program proceeds to S27 where a value "one (1)" is written in the discrimination value memory 66 at its address of the discrimination value (i). Then, the values Xin, Yin, and Zin of the input color data (Xin, Yin, Zin) are added to the X-, Y-, and Z-sum value area of the input color value memory 68 at the address of the discrimination value (i). One (1) is added to the number memory area of the memory 68 at the address of the discrimination value (i). Then, the program proceeds to S28.

On the other hand, when the discrimination value (i) for the input data set (Xin, Yin, Zin) is zero (0) (yes in S25) or when the discrimination value (i) is not equal to either one of the specific discrimination values (no in S26), the program directly proceeds to S28.

Then, it is judged in S28 whether or not input of the input color data sets (Xin, Yin, Zin) to the discrimination value judging portion 60 is completed. When the input of the input color data sets (Xin, Yin, Zin) to the discrimination value judging portion 60 is not completed (no in S28), the program returns to S22. The processes of S22 to S27 are repeated until the input of the input color data set (Xin, Yin, Zin) is completed.

When the input of the input color data sets (Xin, Yin, Zin) is completed (yes in S28), on the other hand, the discriminated color value calculation portion 62 calculates in S29 an average color value set (Xcolori, Ycolori, Zcolori) for each of the specific discrimination values ($i \geq 1$) based on the memory contents of the input color value memory 68.

In more concrete terms, the average color value set (Xcolori, Ycolori, Zcolori) is calculated for each of the specific discrimination values ($i \geq 1$) through the following formulas (5):

$$Xcolori = Xsumi/ni$$
$$Ycolori = Ysumi/ni$$
$$Zcolori = Zsumi/ni \quad (5)$$

where Xsumi, Ysumi, and Zsumi are values now stored in the sum value memory area of the memory 68. These values Xsumi, Ysumi, and Zsumi indicate total values, in X-, Y-, and Z-components, of all the sets of input color data (Xin, Yin, Zin) that reside in the color region indicated by the specific discrimination values ($i \geq 1$). "ni" is a value now stored in the number memory area of the memory 68. This value "ni" indicates the total number of the input color data sets (Xin, Yin, Zin) that reside in the specific color region indicated by the specific discrimination value ($i \geq 1$).

Thus, except for the discrimination values (i) ($i \geq 1$) where the number ni is zero (0), the average color value sets (Xcolori, Ycolori, Zcolori) are calculated set one by one for all the specific discrimination values (i).

Then, as shown in FIG. 12, the calculated average color value sets (Xcolori, Ycolori, Zcolori) are stored in the color value memory 70 in S30 at the addresses indicated by the corresponding discrimination values (i).

Figure 17:
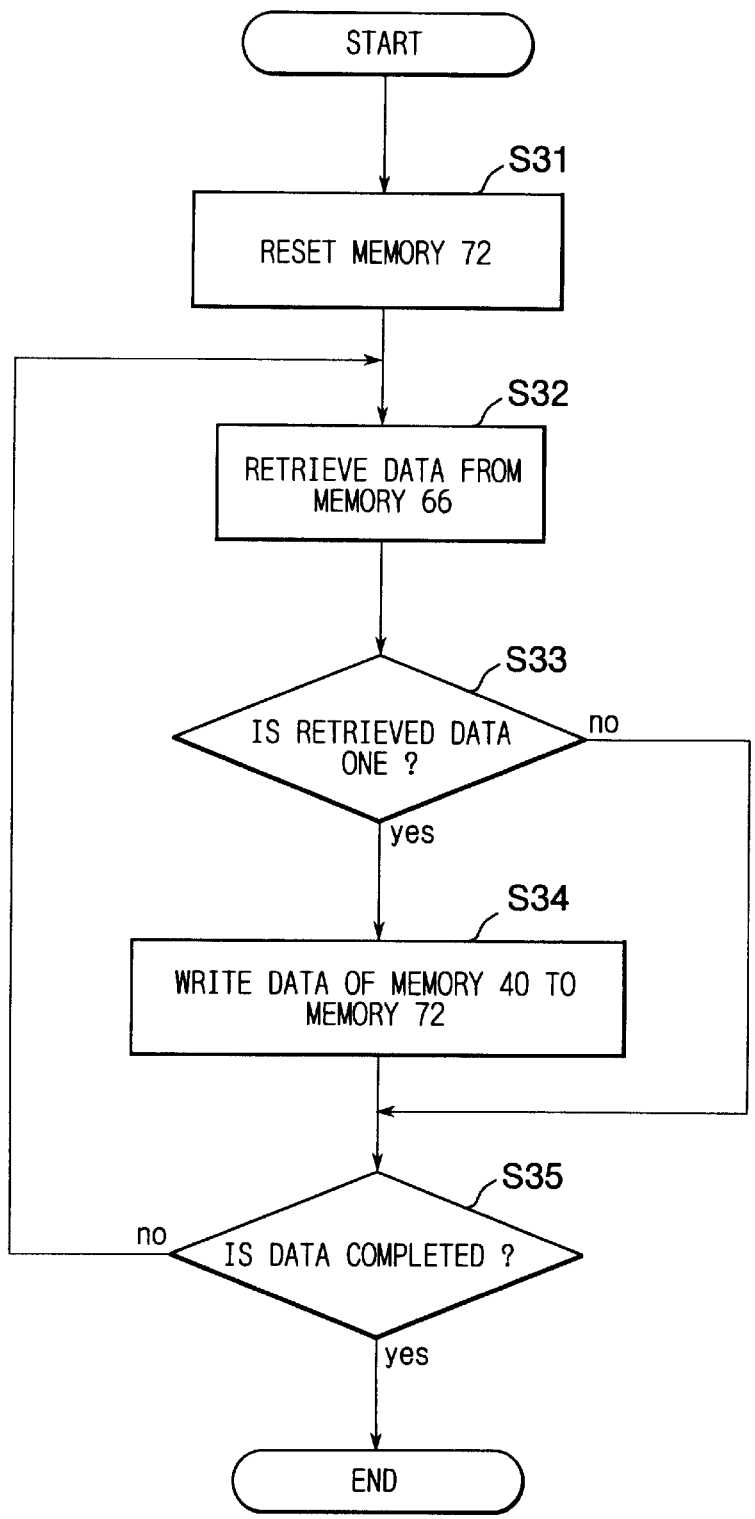
FIG. 17 is a flow chart of an operation of the color appropriate value calculation portion.

Next, the structure of the appropriate color value calculation portion 22 and the operation S2 performed by the portion 22 will be described with reference to FIGS. 15 through 17.

The appropriate color value calculation portion 22, formed in the CPU 12, is for retrieving data from the discrimination value memory 66 in the RAM 16. Based on the retrieved data, the portion 22 retrieves an appropriate color data set (Xbesti, Ybesti, Zbesti) from the appropriate color value memory 40. The portion 22 writes the appropriate color data set (Xbesti, Ybesti, Zbesti) in a second appropriate color value memory 72.

Figures 15, 16:
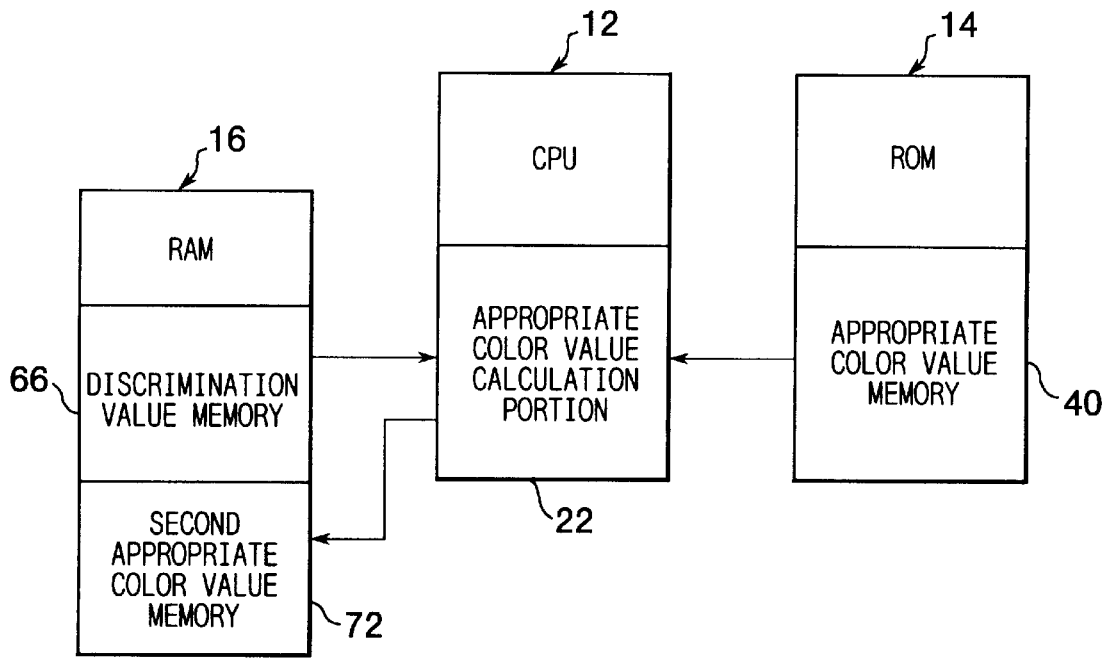
FIG. 15 is a block diagram of a color appropriate value calculation portion.
FIG. 16 shows a color appropriate value memory.

As shown in FIG. 16, the appropriate color value memory 40 stores the discrimination values (i) as its addresses. The memory 40 previously stores an appropriate color value set (Xbesti, Ybesti, Zbesti) in correspondence with each discrimination value (i). For example, the color value set (Xbesti, Ybesti, Zbesti) for the discrimination value 1 is indicative of a typical green grass color.

It is noted that the second appropriate color value memory 72 is created in S2 into the similar structure to that of the appropriate color value memory 40.

Next, the operation S2 of the appropriate color value calculation portion 22 will be described below with reference to FIG. 17.

First, a zero value (0) is written in S31 into the entire memory region of the second appropriate color value memory 72. The appropriate color value calculation portion 22 successively retrieves data from the discrimination value memory 66. When the portion 22 retrieves data which is stored in the memory at an address of one discrimination value (i) in S32, the portion 22 judges in S33 whether or not the retrieved data has a value of one (1). If the data has the value of one (1) (yes in S33), the portion 22 writes, in the memory 72, an appropriate value set (Xbesti, Ybesti, Zbesti) which is stored in the memory 40 at an address of the corresponding discrimination value (i) in S34. Then, the program proceeds to S35. On the other hand, when the retrieved data has the value of zero (0) (no in S33), the program directly proceeds to S35.

Next, the portion 22 judges in S35 whether or not entire data has been retrieved from the discrimination value memory 66. If entire data is not yet retrieved (no in S35), the program returns to S32. When the entire data is retrieved (yes in S35), the program ends.

Thus, data sets (Xbesti, Ybesti, Zbesti) indicative of typical colors are successively retrieved from the memory 40 only for the specific color regions where at least one set of input data (Xin, Yin, Zin) resides.

Next, the structure of the correction characteristic value calculation portion 24 and the operation S3 performed by the portion 24 will be described below with reference to FIGS. 18 through 20.

The correction characteristic value calculation portion 24 is for retrieving the average color value sets (Xcolori. Ycolori, Zcolori) from the color value memory 70. The portion 24 is also for retrieving the appropriate color value sets (Xbesti, Ybesti, Zbesti) from the second appropriate color value memory 72. Based on the retrieved data, the portion 24 calculates a correction characteristic value set (dXi, dYi, dZi) and stores the correction characteristic value set (dXi, dYi, dZi) in a correction characteristic value memory 74.

Figures 18, 19:
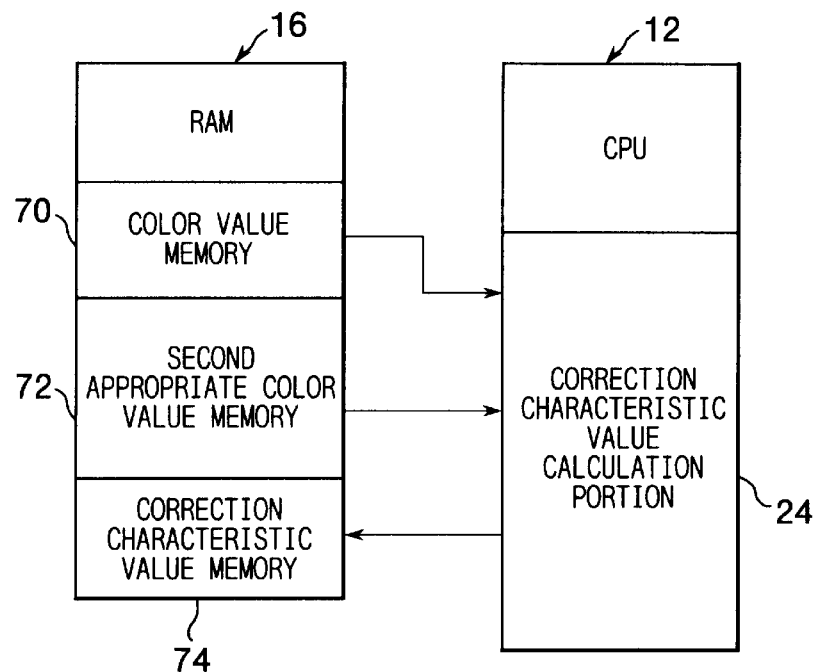
FIG. 18 illustrates a block diagram of a correction characteristic value calculation portion.
FIG. 19 shows a correction characteristic value memory.

As shown in FIG. 19, the correction characteristic value memory 74 stores the discrimination values (i) as addresses. The correction characteristic value memory 74 is for storing, at an address (i) indicative of each of the input data-residing specific color regions, a set of average color values (Xcolori, Ycolori, Zcolori) which is stored in the memory 70 at the same address (i). The memory 74 is also for storing, at that address (i), a set of correction characteristic values (dXi, dYi, dZi) which is calculated based on the set of average values (Xcolori, Ycolori, Zcolori) and the set of appropriate values (Xbetsti, Ybesti, Zbesti) for the same discrimination value (i).

The correction characteristic value calculation portion 24 calculates in S3 the correction characteristic value (dXi, dYi, dZi) in the following manner.

Figure 20:
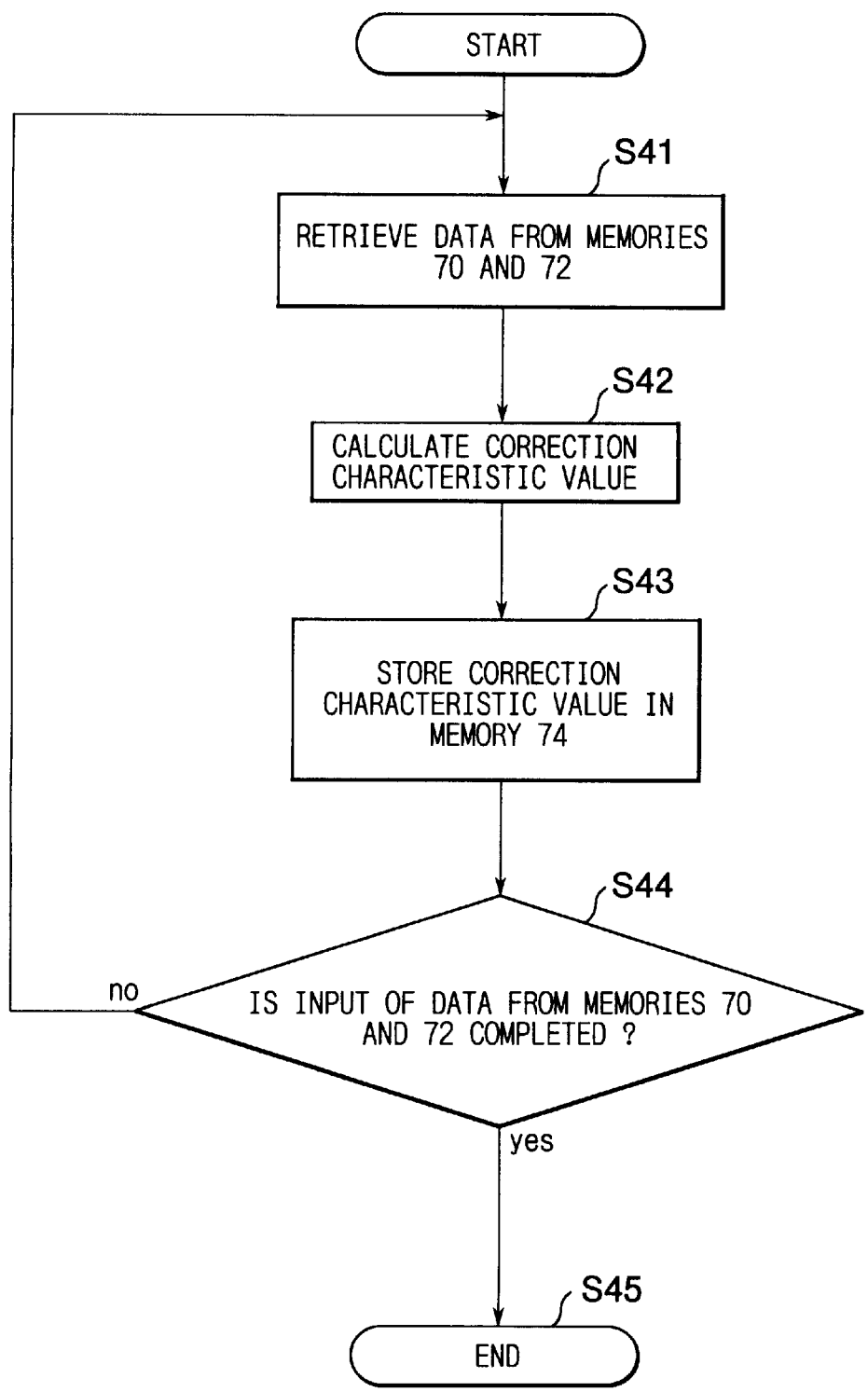
FIG. 20 is a flow chart of an operation of the correction characteristic value calculation portion.

As shown in FIG. 20, the portion 24 searches the sets of average values (Xcolori, Ycolori, Zcolori) stored in the color value memory 70 and the sets of appropriate values (Xbetsti Ybesti, Zbesti) stored in the second appropriate color value memory 72 in the order of the discrimination value (i). In S41, the portion 24 receives a pair of an average value set (Xcolori, Ycolori, Zcolori) and an appropriate value set (Xbetsti, Ybesti, Zbesti) from the same address (i) of the memories 70 and 72. Based on the inputted data, the portion 24 calculates a correction characteristic value set (dXi, dYi, dZi) in the following formulas (6):

$$dXi = Xbesti - Xcolori$$

$$dYi = Ybesti - Ycolori$$

$$dZi = Zbesti - Zcolori \quad (6)$$

In S43, the portion 24 stores the correction characteristic value set (dXi, dYi, dZi) in the correction characteristic value memory area of the correction characteristic value memory 74 at the address (i) as shown in FIG. 19. Also in S43, the set of average color values (Xcolori, Ycolori, Zcolori), retrieved from the memory 70, is stored in the color value memory area of the memory 74 at the same address (i).

Then, the portion 24 judges in S44 whether or not all the data (Xcolori, Ycolori, Zcolori) and (Xbetsti, Ybesti, Zbesti) are retrieved from the memories 70 and 72 and inputted into the portion 24. When the data input is not completed (no in S44), the program returns to S41, and the processes of S41 to S44 are repeated. When the data input is completed (yes in s44), the program ends. As a result, with respect to each of the specific color regions which are selected by the user and in which at least one set of input color data (Xin, Yin, Zin) resides, an average color data set (Xcolori, Ycolori, Zcolori) and a correction characteristic data set (dXi, dYi, dZi) are obtained and stored in the memory 74.

Next, the color-conversion characteristic value memory 42 and the operation of S4 performed by the color-conversion characteristic value correction portion 26 will be described with reference to FIGS. 21 through 23.

As described already, the memory 42 previously stores converted color values (A, B, C) at all the intersections (lattice points) in the lattice space shown in FIG. 21. The lattice points are numbered Xno, Yno, and Zno along the X, Y, and Z directions.

FIG. 22 illustrates how the memory 42 stores one set of the converted color values (A, B, C) at each address indicative of a corresponding lattice point. It is noted that an address number Ad indicative of the address of each lattice point (Xno, Yno, Zno) is represented by the following formula (7):

$$Ad = Zno + ZS*(Yno + YS*Xno) \quad (7)$$

where ZS represents the number by which the color space is divided in the Z-axial direction, and YS represents the number by which the color space is divided in the Y-axial direction. In S4, the corrected color-conversion characteristic value memory 50 is created to have the structure similar to that of the memory 42.

The portion 26 calculates in S4 corrected color-conversion characteristic value sets (a, b, c) from the conversion value sets (A, B, C) in a manner described below.

Figure 23:
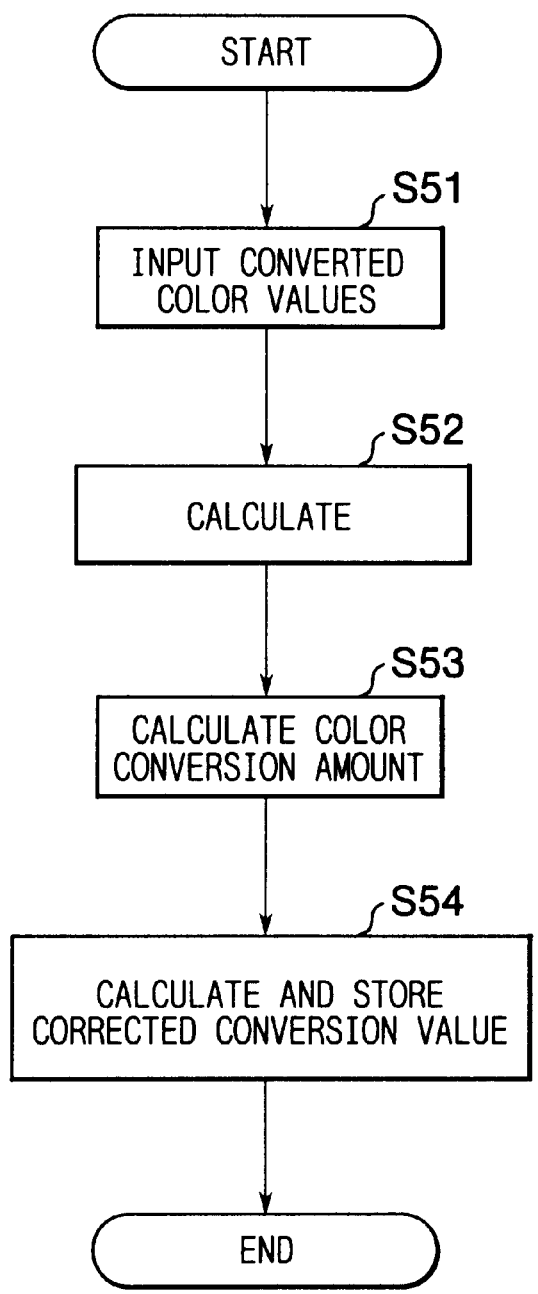
FIG. 23 is a flow chart of an operation by the color conversion characteristic value memory.

As shown in FIG. 23, when the program of S4 starts, the portion 26 retrieves all the sets of color conversion values (A, B, C) from the memory 42 in S51. Then, in S52, the portion 26 compares each set of the inputted color conversion value set (A, B, C) with each set of the average color value sets (Xcolori, Ycolori, Zcolori) stored in the memory 74 of FIG. 19. Then, a nearby color coefficient "ki" is calculated for each discrimination value (i) through the following formula (8):

$$ki = 1/\{(A - Xcolori)^2 + (B - Ycolori)^2 + (C - Zcolori)^2\}^{1/2} \quad (8)$$

Then, in S53, the portion 26 calculates a set of color conversion amounts (dA, dB, dC), based on the calculated nearby coefficients ki and the correction value sets (dXi, dYi, dZi) stored in the memory 74. This calculation is performed through the following formulas (9):

$$dA = \Sigma(ki/T*dXi)$$

$$dB = \Sigma(ki/T*dYi)$$

$$dC = \Sigma(ki/T*dZi) \quad (9)$$

where T=Σki.

In S54, then, the portion 26 calculates, for the color conversion value set (A, B, C), a set of corrected color-conversion characteristic values (a, b, c). This calculation is performed based on the thus obtained color conversion amount set (dA, dB, dC) through the following formulas (10):

$$a = A + dA$$
$$b = B + dB$$
$$c = C + dC \tag{10}$$

The above-described operation is performed so that a corrected conversion characteristic data set (a, b, c) is obtained for each set of the color conversion characteristic data sets (A, B, C).

The thus obtained corrected color-conversion characteristic value set (a, b, c) is stored in S5 in the corrected color-conversion characteristic value memory 50.

Based on the corrected color-conversion characteristic value set (a, b, c) stored in the memory 50, the color conversion portion 28 converts, in S7, the input color data (Xin, Yin, Zin) into the corrected color data (Xout, Yout, Zout) through an interpolation method in the same manner as described already.

That is, first, the portion 28 searches eight lattice points that surround the input color data (Xin, Yin, Zin). Then, in the same manner as indicated by the formulas (1) and (2), the corrected color data (Xout, Yout, Zout) is calculated through interpolating the corrected color-conversion characteristic values (a, b, c), which are stored in the memory 50 for the eight lattice points.

As described above, according to the present embodiment, the color conversion function is corrected in accordance with the input color data (Xin, Yin, Zin) of the original image. The original image is therefore converted into colors which are different from colors of the original image but which are appreciated by the user. According to the present embodiment, one or more specific color is selected by the user. The appropriate color value memory 40 stores appropriate output values (Xbesti, Ybesti, Zbesti) for the specific colors. The color value discrimination portion 20 judges whether or not the input color data (Xin, Yin, Zin) is the specific color. When the input color data (Xin, Yin, Zin) is judged as the specific color, the correction characteristic value calculation portion 24 calculates a correction characteristic value (dXi, dYi, dZi) based on the input color data (Xin, Yin, Zin) and the appropriate calor values (Xbesti, Ybesti, Zbesti). The color-conversion characteristic value correction portion 26 corrects conversion data sets (A, B, C) stored in the color-conversion characteristic value memory 42 based on the correction characteristic value sets (dXi, dYi, dZi). The color conversion portion 28 converts the input color data (Xin, Yin, Zin) based on the corrected conversion data (a, b, c) produced and stored in the corrected color-conversion characteristic value memory 50, thereby outputting desired corrected color data (Xout, Yout, Zout).

Thus, the color conversion device of the present embodiment can correct the color conversion characteristic of the color conversion portion 28 based on the input color data (Xin, Yin, Zin). The color conversion device produces an image for the user's selected specific color based on the appropriate color data set (Xbesti, Ybesti, Zbesti) stored in the appropriate color value memory 40. This method is especially advantageous when the original image is a photograph taken under an inappropriate condition, such as an inappropriate photograph-taking condition and an inappropriate photograph-developing condition. In this case, the photograph may possibly have green grass colors erroneously shifted to red or blue, for example. Taking into account this problem, a converted color value (Xbesti, Ybesti, Zbesti) indicative of a typical green grass color is previously calculated through a subjective evaluation and stored in the memory 40.

Details of the subjective evaluation method will he described below.

A green grass color is displayed on the CRT. The green grass color region is separated from other remaining color regions Colors on the thus separated green grass color region are adjusted precisely so that the CRT will display a green color thought of as typical for green grass. When the CRT properly displays the typical green grass color, the color on the CRT is detected by a colorimeter. Because a value set (X, Y, Z) thus obtained at the calorimeter is defined in the CRT gamut (color reproducible range), the value set is converted or compressed into the printer gamut as shown in FIG. 5(c). The converted value set is stored in the memory 40 as the appropriate color value set (Xbesti, Ybesti, Zbesti) for a discrimination value (i=1) indicative of the green grass color region.

With this structure, even when the input color data (Xin, Yin, Zin) indicates a red- or blue-shifted green grass color, the input color data (Xin, Yin, Zin) can be converted into a color value indicating the typical green grass color. The thus obtained green grass color is not the same as the original green grass color, but can reproduce a green grass color which is most appropriate in view of the human subjective evaluation. The outputted green grass color is therefore appreciable for many people.

The appropriate values (Xbesti, Ybesti, Zbesti) for other color regions II, I, . . . can be prepared in the same manner as described above.

According to the present embodiment, the user can manipulate the key board 90 to select colors as desired to be converted into their typical colors. Accordingly, the user can perform his/her desired color conversion operation.

Figure 24:
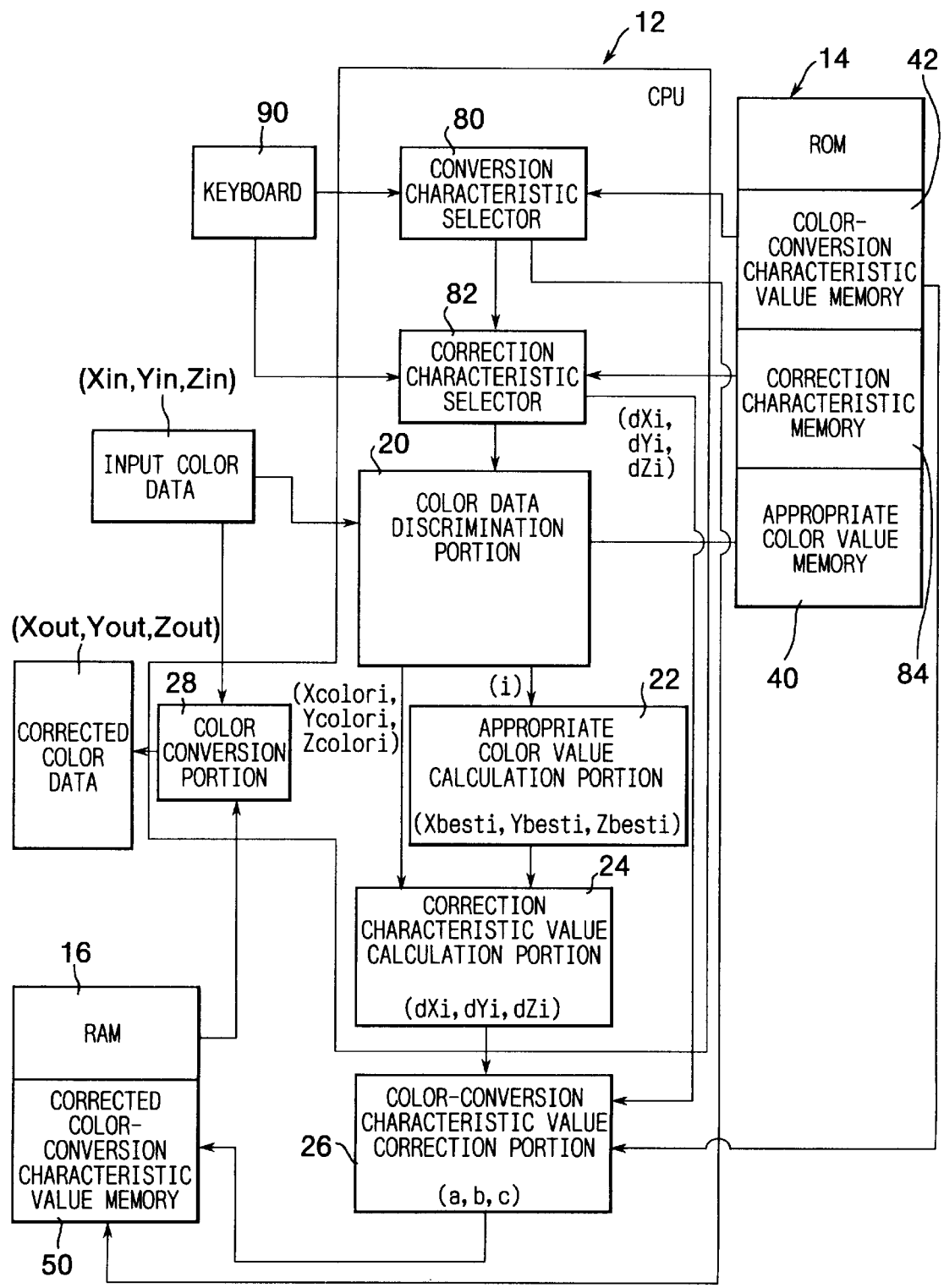
FIG. 24 shows a block diagram of a color conversion device of a second embodiment.

A second embodiment of the present invention will be described below with reference to FIGS. 24 and 25.

The second embodiment is provided for switchingly performing both a conversion operation of the first embodiment as shown in FIG. 5(a) and a conversion operation shown in FIG. 5(b) which uses the standard color conversion characteristic (A, B, C) stored in the memory 42.

When a high quality image is desired to be obtained, the conversion operation of FIG. 5(a) is selected. When an image is desired to be printed within a shorter time period, the conversion operation of FIG. 5(b) is selected.

Also in this embodiment, the CPU 12 is connected to the key board 90 so that data is transmittable between the CPU 12 and the key board 90. According to the present embodiment, the CPU 12 has a conversion characteristic selection portion 80 and a correction characteristic selection portion 82. The ROM 14 is formed with a correction characteristic memory portion 84. The memory portion 84 previously stores therein a standard correction characteristic value set (dXi', dYi', dZi') and a standard average color value set (Xcolori', Ycolori', Zcolori') for each discrimination value (i). The structure of the memory portion 84 is the same as that of the memory 74 shown in FIGS. 18 and 19.

It is noted that the standard correction characteristic value set (dXi', dYi', dZi') and the standard average color value set (Xcolori', Ycolori', Zcolori') are previously calculated for each discrimination value (i) through an experiment described below.

In order to obtain the standard correction characteristic value set (dXi', dYi', dZi') and the standard average color value set (Xcolori', Ycolori', Zcolori') for a green grass color indicated by a discrimination value (1), for example, the CRT is controlled to display several colors including green colors. Then, a color thought of as typical for green grass is selected out of the displayed several colors. The typical green grass color is detected by a colorimeter, converted or compressed into the printer gamut and determined as a standard set of values (Xbesti, Ybesti, Zbesti). Then, a color region, which can be perceived approximately as green grass, is selected out of the displayed several colors. This color region is detected by the calorimeter, and an average value of the detected results are used as the standard set of average values (Xcolori', Ycolori', Zcolori'). Then, the standard correction characteristic value set (dXi', dYi', dZi') is determined by subtracting the values (Xcolori', Ycolori', Zcolori') from the values (Xbesti, Ybesti, Zbesti) in the same manner as described already with the formulas (6).

The conversion characteristic selection portion 80 is for receiving instruction inputted from the key board 90 and color conversion characteristic value sets (A, B, C) from the color-conversion characteristic value memory 42. When the inputted instruction indicates that the user desires to correct for the conversion characteristic sets (A, B, C), the conversion characteristic selection portion 80 outputs that instruction to the correction characteristic selection portion 82. When the instruction indicates that the user does not desire to correct for the conversion characteristic sets (A, B, C), on the other hand, the conversion characteristic selection portion 80 outputs the color conversion characteristic value sets (A, B, C) directly to the corrected color-conversion characteristic value memory 50.

The correction characteristic selection portion 82 is for receiving the instruction from the conversion characteristic selection portion 80, for receiving another instruction inputted from the key board 90, and for receiving the standard correction characteristic data sets (dXi', dYi', dZi') and the standard average color value sets (Xcolori', Ycolori', Zcolori') from the correction characteristic memory portion 84. When the instruction from the key board 90 indicates that the user desires to correct for the correcting manner of the conversion characteristic, the correction characteristic selection portion 82 outputs that instruction to the color value discrimination portion 20 so that the portion 20 starts the color-discrimination operation (shown in FIG. 14) of the first embodiment. As a result, the portions 20, 22, 24, 26, and 28 cooperate to perform the color conversion operation (shown in FIG. 13) of the first embodiment.

On the other hand, when the instruction from the key board 90 indicates that the user does not desire to correct for the correcting manner of the conversion characteristic, the portion 82 supplies the standard correction characteristic value sets (dXi', dYi', dZi') and the standard average color value sets (Xcolori', Ycolori', Zcolori') directly to the color-conversion characteristic value correction portion 26. The portion 26 will retrieve the color conversion value sets (A, B, C) from the color-conversion characteristic value memory 42, and correct the retrieved data (A, B, C) into corrected data (a, b, c) with using the supplied standard data (dXi', dYi', dZi') and (Xcolori', Ycolori', Zcolori').

Thus, the color-conversion characteristic value correction portion 26 of the present embodiment is designed so as to be capable of receiving both: the correction characteristic value sets (dXi, dYi, dZi) calculated at the correction characteristic value calculation portion 24; and the standard correction characteristic value sets (dXi', dYi', dZi') retrieved at the portion 82 from the memory 84.

The corrected color-conversion characteristic value memory 50 is for receiving the corrected color-conversion characteristic value sets (a, b, c) obtained at the color-conversion characteristic value correction portion 26. The corrected color-conversion characteristic value memory 50 is also capable of receiving the color-conversion characteristic values (A, B, C) outputted directly from the conversion characteristic selection portion 80. Based on the inputted data, the corrected color-conversion characteristic value memory 50 outputs conversion characteristic data Lo the color conversion portion 28.

Except for the above-described points, the color conversion device of the present embodiment is the same as that of the first embodiment.

The color conversion device of the present embodiment operates as described below.

Figure 25:
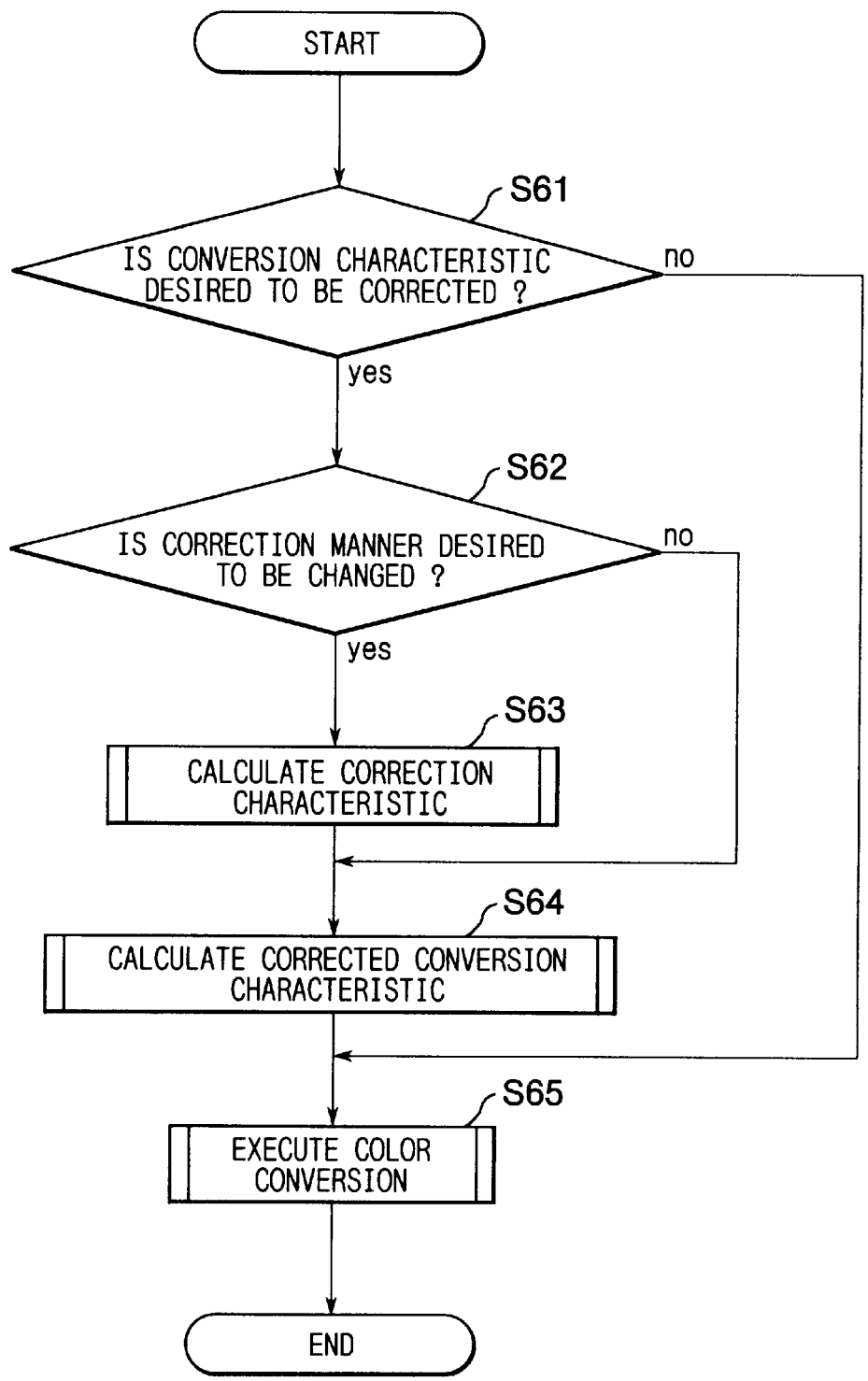
FIG. 25 is a flow chart of an operation by the second embodiment.

As shown in FIG. 25, when the program starts, the conversion characteristic selection portion 80 asks the user in S61 whether the user wants to correct the conversion characteristic of the color conversion portion 28. When the user wants the correction (yes in S61), the correction characteristic selection portion 82 further asks the user whether or not the user wants to correct the correction manner of the conversion characteristic in S62. When the user wants to correct the correction manner (yes in S62), the portions 20 through 24 calculate a correction characteristic value set (dXi, dYi, dZi) and an average color value set (Xcolori, Ycolori, Zcolori) for the input data-residing specific color regions (i) in S63 in the same manner as in the first embodiment. That is, S1 through S3 shown in FIG. 13 are performed in S63.

Then, in S64, the portion 26 calculates corrected color-conversion characteristic value sets (a, b, c) based on the correction characteristic value sets (dXi, dYi, dZi) and the average color value sets (Xcolori, Ycolori, Zcolori). In S65, the color conversion portion 28 performs a color conversion operation based on the thus produced corrected color-conversion characteristic value sets (a, b, c).

The operations in S64 are the same as the steps S4 and S5 in the first embodiment, and the operations in S65 are the same as the steps S6–S8 in the first embodiment.

On the other hand, when the user does not want to correct for the conversion characteristic data sets (A, B, C) of the color conversion portion 28 (no in S61), the conversion characteristic selection portion 80 retrieves the conversion characteristic data sets (A, B, C) from the memory 42 and writes the retrieved data (A, B, C) in the memory 50. Then, the program directly proceeds to S65. Accordingly, color conversion operation is achieved with the non-corrected color conversion data (A, B, C).

When the user does not want to correct the correction manner (No in S62), the correction characteristic selection portion 82 retrieves the standard correction characteristic value sets (dXi', dYi', dZi') and the standard average color value sets (Xcolori', Ycolori', Zcolori') from the correction characteristic memory portion 84. The portion 82 then transfers the retrieved data (dXi', dYi', dZi') and (Xcolori', Ycolori', Zcolori') to the portion 26. The program then proceeds to S64. Then, in S64, the portion 26 calculates corrected color-conversion characteristic value sets (a, b, c) based on the standard correction characteristic value sets (dXi', dYi', dZi') and the standard average color value sets (Xcolori', Ycolori', Zcolori').

The color conversion device of the present invention is designed to normally convert colors of the original image into different colors. Accordingly, there is a possibility that the color conversion device will fail to provide the user's desired colors. Accordingly, the second embodiment is designed to allow the user to select the color conversion characteristic and the conversion characteristic correction manner. The color conversion device of the second embodiment can perform the user's desired color conversion operation.

While the invention has been described in detail with reference to specific embodiments thereof, it would be apparent to those skilled in the art that various changes and modifications may be made therein without departing from the spirit of the invention.

For example, in the second embodiment, the color conversion device judges whether or not the user wants to correct the color conversion characteristic. However, other various types of selection can be achieved. For example, the conversion characteristic selection portion 80 and/or the correction characteristic selection portion 82 can allow the user to select a region in the inputted image. The color conversion or the color conversion correction manner can be changed only for the selected region. The color conversion or the color conversion correction manner can be maintained for other regions. By thus selecting the color conversion or the color conversion correction manner, the color conversion device can provide further flexible color conversion operation.

In the above-described embodiments, the color value discrimination information memory 64 is formed in the ROM 14. However, the memory 64 may be formed in the RAM 16. The discrimination values (i) may be changed according to the user's manipulation of the key board 90. For example, when the user sets that the inputted image data (Xin, Yin, Zin) relates to a landscape, the CPU 12 will set, in the memory 64, a discrimination value "1" for the green grass color region I (cubes A4–A6 and A12) and will set a discrimination value "2" for the blue sky region II (cubes A15, A16, A20–A22, A26, and A27). The CPU will set a discrimination value "0" for all the remaining regions. In this case, the widely-distributed green grass colors and blue sky colors are converted into the typical green gras color and the typical blue sky color.

In the above description, the color conversion device is designed to convert specific colors into their typical colors. However, the device can be designed to convert the specific colors into the user's desired various kinds of different colors.

In the above-described embodiments, the specific colors, desired to be converted into different colors, are selected by the user and set by the portion 20. However, the specific colors may be previously set in the color conversion device.

In the above-described embodiments, the appropriate color values (Xbesti, Ybesti, Zbesti), indicative of the typical colors, are prepared as values converted or compressed into the printer gamut. However, the values (Xbesti, Ybesti. Zbesti) may be prepared as those defined in the CRT gamut, i.e., unconverted values.

As described above, in the color conversion device of the present invention, the color conversion portion is designed so as to be capable of converting a color signal of an inputted image into a corrected color signal of a corrected image. The conversion characteristic memory stores a predetermined conversion characteristic value indicative of a color conversion characteristic of the color conversion portion. The specific color information memory stores information on each of one or more specific colors. The judging portion judges whether or not the color signal of the inputted image corresponds to the specific color. The correction value calculation portion calculates a characteristic correction value based on the judged color signal and the information stored in the specific color information memory portion. The conversion characteristic correction portion corrects the conversion characteristic value, stored in the conversion characteristic memory, based on the characteristic correction value.

Accordingly, the color conversion device can correct for the color conversion operation in accordance with the inputted image. The color conversion device can therefore obtain colors different from those of the inputted image. Accordingly, even when inputted with a degraded image, the color conversion device can output a user's appreciated image.

The information, stored in the specific color information memory, may include a converted color signal. In this case, the correction value calculation portion calculates the characteristic correction value based on the color signal of the inputted image and the converted color signal stored in the specific color information memory.

Accordingly, out of the color signal of the inputted image, the one or more specific color is easily converted based on the converted color signal which is previously stored in the specific color information memory portion. The color conversion device can therefore produce the user's appreciated color for the specific color.

In the color conversion device, the correction characteristic memory stores a fixed characteristic correction value indicative of a predetermined correction characteristic of the conversion characteristic correction portion. The correction characteristic selection portion selects the correction characteristic of the conversion characteristic correction portion. The conversion characteristic correction portion corrects for the conversion characteristic value stored in the conversion characteristic memory based on information selected by the correction characteristic selection portion and at least one of the characteristic correction value calculated by the correction value calculation portion and the fixed characteristic correction value stored in the correction characteristic memory.

Accordingly, among the inputted image, the one or more specific color is easily converted with the calculated characteristic correction value. The color conversion device can therefore output the user's appreciated color for the specific color.

The conversion characteristic selection portion selects a conversion characteristic of the color conversion portion. The color conversion portion converts the color signal in the inputted image based on the information selected by the conversion characteristic selection portion and at least one of the conversion characteristic value calculated by the conversion characteristic correction portion and the fixed conversion characteristic value stored in the conversion characteristic memory.

Accordingly, with the corrected conversion characteristic value, the color of the inputted image can be optionally changed to satisfy the user's desire. The correction operation can be performed easily.

The specific color selection portion selects a specific color to be judged by the judging portion. Accordingly, when the user selects a specific color through the specific color selection portion, the specific color can be easily discriminated from other colors in the inputted image. This operation can be more easily performed than the conventional image editing operation is.

What is claimed is:

1. A color conversion device capable of converting a color signal of an inputted image into a corrected color signal indicative of a corrected image, the device comprising:

conversion characteristic memory means for storing a conversion characteristic value indicative of a color conversion characteristic;

specific color information memory means for storing color conversion characteristic information on a desired color for each of one or more specific color;

judging means for judging whether a color signal indicative of each picture element of an inputted image corresponds to the specific color;

correction value calculation means for calculating a characteristic correction value appropriate for the inputted image based on only one or more color signal that is judged to correspond to the specific color and the color conversion characteristic information stored in the specific color information memory means;

conversion characteristic correction means for correcting, based on the characteristic correction value, the conversion characteristic value, stored in the conversion characteristic memory means, to be used for the inputted image; and color conversion means for converting the color signal indicative of each picture element of the inputted image into another color signal based on the corrected conversion characteristic value.

2. A color conversion device of claim 1, wherein the color conversion characteristic information, stored in the specific color information memory means, includes a converted color signal indicative of a desired color for the specific color, and wherein the correction value calculation means calculates the characteristic correction value based on the color signal of the inputted image that is judged to correspond to the specific color and the converted color signal for the specific color stored in the specific color information memory means.

3. A color conversion device of claim 2, wherein the correction value calculation means calculates an average value of all the one or more color signal that is judged to reside in the specific color range and that is included in the inputted image, the correction value calculation means calculating the characteristic correction value based on the average value and the converted color signal stored in the specific color information memory means for the specific color.

4. A color conversion device of claim 1, further comprising:

correction characteristic memory means for storing a fixed characteristic correction value indicative of a predetermined correction characteristic;

characteristic correction selection means for enabling an operator to select one of a first correction process to control the conversion characteristic correction means to form the correction operation with the fixed characteristic correction value; and a second correction process, different from the first process, to control the conversion characteristic correction means to perform the correction operation with the characteristic correction value calculated by the correction value calculation means; and correction control means for controlling when the operator selects the first correction process, the conversion characteristic correction means to correct for the conversion characteristic value stored in the conversion characteristic memory means using the fixed characteristic correction value stored in the correction characteristic memory means, and for controlling, when the operator selects the second correction process, to control the judging means to perform the judging operation, to control the correction value calculation means to perform the calculation operation to calculate the characteristic correction value appropriate for the inputted image, and to control the conversion characteristic correction means to correct for the conversion characteristic value stored in the conversion characteristic memory means using the calculated characteristic correction value.

5. A color conversion device of claim 1, further comprising:

conversion characteristic selection means for enabling an operator to select a first conversion process and a second conversion process different from the first conversion process; and conversion control means for controlling, when the operator selects the first conversion process, the color conversion means to convert the color signal of each picture element in the inputted image using the conversion characteristic value stored in the conversion characteristic memory means, and for controlling when the operator selects the second conversion process, to control the judging means to perform the judging operation, to control the correction value calculation means to perform the calculation operation to calculate the characteristic correction value appropriate for the inputted image, to control the conversion characteristic correction means to correct for the conversion characteristic value stored in the conversion characteristic memory means using the calculated characteristic correction value, and to control the color conversion means to convert the color signal of each picture element in the inputted image using the corrected conversion characteristic value.

6. A color conversion device of claim 1, further comprising specific color selection means for enabling a user to select the specific color desired to be judged by the judging means.

7. A color conversion device of claim 1, wherein the conversion characteristic memory means stores a plurality of converted color signals in correspondence with a plurality of color signals, and wherein the conversion characteristic correction means corrects all the converted color signals, stored in the conversion characteristic memory means, based on the characteristic correction value.

8. A color conversion device of claim 7, wherein the color conversion means converts the color signal indicative of each picture element of the inputted image into another color signal through an interpolation process based on the corrected converted color signals, stored in the conversion characteristic memory means.

9. A color conversion device of claim 2, wherein the specific color information memory means stores therein a single converted color signal, into which any color signal, whose color point resides in a color range predetermined for the specific color, is desired to be converted, wherein the judging means judges whether the color signal of each picture element of the inputted image resides in the color range predetermined for the specific color, and wherein the correction value calculation means calculates the characteristic correction value based on all of one or more color signals of the inputted image that is judged to reside in the specific color range and the converted color signal stored in the specific color information memory means for the specific color.

10. A color conversion device of claim 3, wherein the correction value calculation means calculates, as the characteristic correction value, a difference between the average value and the converted color signal for the specific color.

* * * * *